US009359537B2

(12) United States Patent
Nakajima et al.

(10) Patent No.: US 9,359,537 B2
(45) Date of Patent: Jun. 7, 2016

(54) BLOCK COPOLYMER COMPOSITION FOR VISCOUS ADHESIVE, AND ADHESIVE COMPOSITION

(71) Applicants: Asahi Kasei Chemicals Corporation, Tokyo (JP); Japan Elastomer Co., Ltd., Tokyo (JP)

(72) Inventors: Shigeo Nakajima, Tokyo (JP); Takahiro Hisasue, Tokyo (JP); Kenji Ebara, Tokyo (JP); Yukinori Nakamichi, Tokyo (JP)

(73) Assignees: Asahi Kasei Chemicals Corporation, Tokyo (JP); Japan Elastomer Co., Ltd., Tokyo (JP)

( * ) Notice: Subject to any disclaimer, the term of this patent is extended or adjusted under 35 U.S.C. 154(b) by 0 days.

(21) Appl. No.: 14/416,830

(22) PCT Filed: Jul. 18, 2013

(86) PCT No.: PCT/JP2013/069551
§ 371 (c)(1),
(2) Date: Jan. 23, 2015

(87) PCT Pub. No.: WO2014/017380
PCT Pub. Date: Jan. 30, 2014

(65) Prior Publication Data
US 2015/0175855 A1 Jun. 25, 2015

(30) Foreign Application Priority Data
Jul. 25, 2012 (JP) .................................. 2012-165195

(51) Int. Cl.
*C08L 53/02* (2006.01)
*C08F 297/04* (2006.01)
*C09J 153/02* (2006.01)

(52) U.S. Cl.
CPC ........... *C09J 153/02* (2013.01); *C08F 297/044* (2013.01)

(58) Field of Classification Search
CPC .. C08L 2205/025; C08L 53/02; C08F 297/04
See application file for complete search history.

(56) References Cited

U.S. PATENT DOCUMENTS

| | | | |
|---|---|---|---|
| 3,239,478 A | 3/1966 | Harlan | |
| 4,985,499 A | 1/1991 | Nishikawa et al. | |
| 4,994,508 A | 2/1991 | Shiraki et al. | |
| 6,291,583 B1 * | 9/2001 | Komatsuzaki et al. | 525/95 |
| 2004/0267570 A1 * | 12/2004 | Becker | A61B 5/00 705/2 |
| 2007/0173591 A1 * | 7/2007 | Kanae et al. | 524/502 |

FOREIGN PATENT DOCUMENTS

| | | | | |
|---|---|---|---|---|
| EP | 0838510 A | 4/1998 | | |
| EP | 1411100 A1 | 4/2004 | | |
| JP | S44-017037 B | 7/1969 | | |
| JP | S56-049958 B | 11/1981 | | |
| JP | S61-261310 A | 11/1986 | | |
| JP | S61-278578 A | 12/1986 | | |
| JP | H02-001788 A | 1/1990 | | |
| JP | H02-085042 A | 3/1990 | | |
| JP | 05093176 A | * 4/1993 | ............. | C09J 153/02 |
| JP | H05-093176 A | 4/1993 | | |
| JP | H05-171003 A | 7/1993 | | |
| JP | H05-069874 B | 10/1993 | | |
| JP | 2000-282006 A | 10/2000 | | |
| JP | 2000-309767 A | 11/2000 | | |
| JP | 2004-137297 A | 5/2004 | | |
| JP | 2004-238548 A | 8/2004 | | |
| JP | 2004238548 A | * 8/2004 | ............. | C09J 153/02 |
| JP | 2010-001371 A | 1/2010 | | |
| TW | 2012-26504 A | 7/2012 | | |
| WO | 2012/050046 A1 | 4/2012 | | |

OTHER PUBLICATIONS

Machine Translation of JP 05-093176.*
European Search Report issued in related European Patent Application No. 13823840.7 dated Jul. 7, 2015.
"Secchaku (Adhesion)," vol. 32, No. 1, p. 27 (1988) (see partial English translation).
Written Opinion issued in corresponding International Patent Application No. PCT/JP2013/069551 dated Oct. 22, 2013.
International Search Report issued in corresponding International Patent Application No. PCT/JP2013/069551 dated Oct. 22, 2013.
International Preliminary Report on Patentability issued in corresponding International Patent Application No. PCT/JP2013/069551 dated Jan. 27, 2015.

* cited by examiner

*Primary Examiner* — Mark Kaucher
(74) *Attorney, Agent, or Firm* — Morgan, Lewis & Bockius LLP

(57) ABSTRACT

It is an object to provide a block copolymer composition for a viscous adhesive, which will be a viscous adhesive composition excellent in balance of the adhesive properties such as tack strength and tackiness, having a low melt viscosity, and excellent solubility, coating properties, ejection stability, and surface skin quality. The block copolymer composition for a viscous adhesive having:

a component (a) in an amount of 50 mass % or more and 90 mass % or less; and a component (b) in an amount of 10 mass % or more and 50 mass % or less;

a content of the vinyl aromatic monomer unit being 25 to 50 mass %;

a viscosity of the 15 mass % toluene solution being 10 to 40 mPa·s; and a number average molecular weight ratio of the component (b) to the component (a) being 2.0 to 4.0.

11 Claims, No Drawings

BLOCK COPOLYMER COMPOSITION FOR VISCOUS ADHESIVE, AND ADHESIVE COMPOSITION

TECHNICAL FIELD

The present invention relates to a block copolymer composition for a viscous adhesive, and a viscous adhesive composition.

BACKGROUND ART

In recent years, a vinyl aromatic monomer-conjugated diene monomer based block copolymer (e.g. SBS: styrene-butadiene-styrene block copolymer, and SIS: styrene-isoprene-styrene block copolymer) is widely used as a solution-type or a hot melt-type base polymer for adhesives or viscous adhesives. For example, in Patent Literature 1 and Patent Literature 2, a viscous adhesive composition and a viscous adhesive composition made from SBS are disclosed. However, a viscous adhesive composition or a viscous adhesive composition made from SBS or SIS has an insufficient balance between workability and adhesion properties such as tack strength, with high melt viscosity, being inadequate from the viewpoints of solubility, heating stability, coating properties, ejection stability, and surface skin quality.

As a method for improving the properties, a viscous adhesive composition containing a triblock copolymer and a diblock copolymer is disclosed in Patent Literature 3 and Non Patent Literature 1.

Further, a viscous adhesive composition including a block copolymer obtained by coupling is disclosed in Patent Literature 4, using a specific bifunctional coupling agent (e.g. aliphatic monoesters and specific dihalogen compounds).

Further, a composition including a block copolymer of a vinyl aromatic hydrocarbon compound and a conjugated diene compound, hydrogenated at a specific ratio, and a tackifier are disclosed in Patent Literature 5.

Further, adhesive compositions including two or more block copolymer compositions are disclosed as an improvement method in Patent Literature 6 and Patent Literature 7.

CITATION LIST

Patent Literature

Patent Literature 1: Japanese Patent Publication No. 44-17037
Patent Literature 2: Japanese Patent Publication No. 56-49958
Patent Literature 3: Japanese Patent Laid-Open No. 61-278578
Patent Literature 4: Japanese Patent Laid-Open No. 61-261310
Patent Literature 5: Japanese Patent Publication No. 5-69874
Patent Literature 6: Japanese Patent Laid-Open No. 2000-309767
Patent Literature 7: Japanese Patent Laid-Open No. 2004-137297

Non Patent Literature

Non Patent Literature 1: I. Ishii, "Quality design of SIS-based adhesive", Adhesion and Polymer Publication Society, Vol. 32, No. 1, pp. 27-28, Jan. 25, 1988.

SUMMARY OF INVENTION

Technical Problem

However, the viscous adhesive compositions and adhesive compositions disclosed in Patent Literature 3 and 4 and Non Patent Literature 1 have insufficient effect for improving the various performances. Further, the composition disclosed in Patent Literature 5 has an insufficient balance performance between tack strength and tackiness, being inadequate from the viewpoints of solubility, coating properties, ejection stability, and surface skin quality. The viscous adhesive compositions disclosed in Patent Literature 6 and Patent Literature 7 are required for further improvement from the viewpoints of solubility, coating properties, ejection stability, and surface skin quality, in addition to improvement in balance performance between tack strength and tackiness.

It is an object of the present invention, in view of the conventional problems in the art, to provide a block copolymer composition for a viscous adhesive, which will be a viscous adhesive composition excellent in balance of the adhesive properties such as tack strength and tackiness, having a low melt viscosity, and excellent solubility, coating properties, ejection stability, and surface skin quality; and a viscous adhesive composition including the block copolymer composition for a viscous adhesive.

Solution to Problem

As a result of extensive study for solving the problems, the present inventors found that a viscous adhesive composition including two block copolymers having a specific structure, composition and number average molecular weight, a tackifier, and a softener can solve the problems, and the present invention was thus completed.

The present invention is described as follows.
[1]
A block copolymer composition for a viscous adhesive comprising:
a component (a): 50 mass % or more and 90 mass % or less of a block copolymer having a number average molecular weight of 10,000 or more and 60,000 or less, comprising a polymer block (A) mainly including a vinyl aromatic monomer unit and a polymer block (B) mainly including a conjugated diene monomer unit; and
a component (b): 10 mass % or more and 50 mass % or less of a block copolymer having a number average molecular weight of more than 120,000 and 200,000 or less, comprising a polymer block (A) mainly including a vinyl aromatic monomer unit and a polymer block (B) mainly including a conjugated diene monomer unit;
a content of the vinyl aromatic monomer unit being 25 to 50 mass %;
the composition having a 15 mass % toluene solution viscosity of 10 to 40 mPa·s; and
a number average molecular weight ratio of the component (b) to the component (a) being 2.0 to 4.0.
[2]
The block copolymer composition for the viscous adhesive according to the above [1], wherein
the component (a) is a diblock copolymer represented by a formula (A-B); and
the component (b) is a tribranch block copolymer represented by a formula $(A-B)_3X$, wherein X represents a residue of a coupling agent or a residue of a polymerization initiator.

[3]
The block copolymer composition for the viscous adhesive according to the above [1] or [2], wherein the number average molecular weight ratio of the component (b) to the component (a) is 2.3 to 3.6.

[4]
The block copolymer composition for the viscous adhesive according to any one of the above [1] to [3], wherein
the content of the component (a) is more than 80 mass % and 90 mass % or less; and
the content of the component (b) is 10 mass % or more and less than 20 mass %.

[5]
The block copolymer composition for the viscous adhesive according to any one of the above [1] to [3], wherein
the content of the component (a) is 50 mass % or more and 80 mass % or less; and
the content of the component (b) is 20 mass % or more and 50 mass % or less.

[6]
The block copolymer composition for the viscous adhesive according to any one of the above [1] to [5], wherein the number average molecular weight of the component (b) is 130,000 or more and 200,000 or less.

[7]
The block copolymer composition for the viscous adhesive according to any one of the above [1] to [6], wherein the number average molecular weight of the component (b) is 160,000 or more and 200,000 or less.

[8]
A viscous adhesive composition comprising:
the block copolymer composition for the viscous adhesive according to any one of the above [1] to [7] in an amount of 100 parts by mass;
a tackifier in an amount of 100 to 400 parts by mass; and
a softener in an amount of 50 to 150 parts by mass.

Advantageous Effects of Invention

According to the present invention, a block copolymer composition for a viscous adhesive, which will be a viscous adhesive composition excellent in balance of the adhesive properties such as tack strength and tackiness, having a low melt viscosity, and excellent solubility, coating properties, ejection stability, and surface skin quality; and a viscous adhesive composition including the block copolymer composition for a viscous adhesive can be achieved.

DESCRIPTION OF EMBODIMENTS

Embodiments of the present invention (hereinafter referred to as "present embodiments") are described in detail in the following. The present invention, however, is not limited to the following embodiments, capable of being put into practice with various modifications within the scope thereof.
(Block Copolymer Composition for a Viscous Adhesive)
The block copolymer composition for a viscous adhesive of the present embodiments includes:
component (a): 50 mass % or more and 90 mass % or less of a block copolymer having a number average molecular weight of 10,000 or more and 60,000 or less, comprising a polymer block (A) mainly including a vinyl aromatic monomer unit, and a polymer block (B) mainly including a conjugated diene monomer unit, and
component (b): 10 mass % or more and 50 mass % or less of a block copolymer having a number average molecular weight of more than 120,000 and 200,000 or less, comprising a polymer block (A) mainly including a vinyl aromatic monomer unit, and a polymer block (B) mainly including a conjugated diene monomer unit,
the content of the vinyl aromatic monomer unit being 25 to 50 mass %,
the composition having a 15 mass % toluene solution viscosity of 10 to 40 mPa·s, and
the number average molecular weight ratio of the component (b) to the component (a) being 2.0 to 4.0.
(Structure)
The block copolymer composition for a viscous adhesive of the present embodiments includes a block copolymer having a polymer block (A) mainly including a vinyl aromatic monomer unit (hereinafter may be referred to as "polymer block A" or "A") and a polymer block (B) mainly including a conjugated diene monomer unit (hereinafter may be referred to as "polymer block B" or "B").

"A polymer block (A) mainly including a vinyl aromatic monomer unit" means a polymer block A which contains 50 mass % or more, preferably 70 mass % or more, more preferably 85 mass % or more, further more preferably 95 mass % or more, of a vinyl aromatic monomer unit. "A polymer block (B) mainly including a conjugated diene monomer unit" means a polymer block B which contains 50 mass % or more, preferably 70 mass % or more, more preferably 85 mass % or more, of a conjugated diene monomer unit. Hereinafter, each component will be described in more detail.
(Block Copolymer)
(Component (a))
The component (a) is a block copolymer having a number average molecular weight of 10,000 or more and 60,000 or less, which contains a polymer block (A) mainly including a vinyl aromatic monomer unit and a polymer block (B) mainly including a conjugated diene monomer unit, being included in a block copolymer composition for a viscous adhesive in an amount of 50 mass % or more and 90 mass % or less. The range of a number average molecular weight of the block copolymer component (a) is 10,000 or more and 60,000 or less, preferably 20,000 or more and 60,000 or less, more preferably 25,000 or more and 60,000 or less, further more preferably 30,000 or more and 60,000 or less, and most preferably 40,000 or more and 60,000 or less. The number average molecular weight of the component (a) can be determined by the method described in Examples. With a number average molecular weight of the component (a) in such a range, a block copolymer composition for a viscous adhesive and a viscous adhesive composition can be produced, having excellent tackiness, tack strength, solubility, coating properties, ejection stability, and surface skin quality.

Specific examples of the structure of component (a) include $(A-B)_n$, $(A-B)_nA$, and $(B-A)_nB$, though not being particularly limited thereto. Among these, a diblock copolymer represented by the formula (A-B) is preferred. Due to such a structure of the component (a), a block copolymer composition for a viscous adhesive and a viscous adhesive composition tend to have excellent tackiness, tack strength, solubility, coating properties, ejection stability, and surface skin quality. In the formulae, n represents an integer of 1 or more, preferably an integer of 1 to 5.
(Component (b))
The component (b) is a block copolymer having a number average molecular weight of more than 120,000 and 200,000 or less, which contains a polymer block (A) mainly including a vinyl aromatic monomer unit and a polymer block (B) mainly including a conjugated diene monomer unit, being included in a block copolymer composition for a viscous adhesive in an amount of 10 mass % or more and 50 mass % or less. The range of a number average molecular weight of the block copolymer component (b) is more than 120,000 and 200,000 or less, preferably 130,000 or more and 200,000 or less, more preferably 160,000 or more and 200,000 or less, or preferably 140,000 or more and 190,000 or less, more preferably 160,000 or more and 190,000 or less. The number average molecular weight of the component (b) can be determined by the method described in Examples. With a number average molecular weight of the component (b) in such a range, a block copolymer composition for a viscous adhesive and a viscous adhesive composition can be produced, having excellent tackiness, tack strength, solubility, coating properties, ejection stability, and surface skin quality.

In particular, with a number average molecular weight of the block copolymer component (b) of 160,000 or more and a content of the component (b) of 20 mass % or more and 50 mass % or less, the ejection stability and the surface skin quality tend to be further improved, which is preferable.

Specific examples of the structure of component (b) include $(A-B)_mX$ and $(B-A)_mX$, though not being particularly limited thereto. Among these, a tribranch block copolymer represented by a formula $(A-B)_3X$ (hereinafter may be referred to as "trifunctional block copolymer) is preferred. In the formulae, X represents the residue of a coupling agent or the residue of a polymerization initiator, and m represents an integer of any of 2, 3 and 4. Due to inclusion of the tribranch block copolymer, a block copolymer composition for a viscous adhesive and a viscous adhesive composition tend to have excellent tackiness, tack strength, solubility, coating properties, ejection stability, and surface skin quality.

In comparison with a dibranch (difunctional coupling) block copolymer component (b) represented by a formula $(A-B)_2X$, the tribranch block copolymer component (b) represented by the formula $(A-B)_3X$ tends to make a viscous adhesive composition superior in tackiness. In comparison with a multifunctional coupling block copolymer represented by the general formula $(A-B)_nX$ (n=4 or more), the tribranch block copolymer component (b) represented by the formula $(A-B)_3X$ tends to make a viscous adhesive composition superior in tack strength.

Although the combination of the component (a) and the component (b) is not particularly limited, specific examples of the preferable component (a) include a diblock copolymer represented by the formula (A-B), and specific examples of the preferable component (b) include a tribranch block copolymer represented by the formula $(A-B)_3X$. As described in detail below, such a combination of the component (a) and the component (b) can be obtained by coupling a part of the component (a) with use of a trifunctional coupling agent or the like. More specifically, the component (a) is obtained as the diblock copolymer left in partial coupling and the component (b) is obtained as the tribranch block copolymer after coupling. Due to inclusion of such a combination of the component (a) and the component (b), a block copolymer composition for a viscous adhesive and a viscous adhesive composition tend to have excellent tackiness, tack strength, solubility, coating properties, ejection stability, and surface skin quality.

The inclusion of the tribranch block copolymer as component (b) in a block copolymer for a viscous adhesive can be determined from the difference in the peak position of the molecular weight distribution curve in gel permeation chromatography (GPC). More specifically, since the below-mentioned tribranch block copolymer (component (b)) tends to have a number average molecular weight 2.3 to 3.6 times that of diblock copolymer (component (a)), the inclusion of the diblock copolymer component (a) and the tribranch block copolymer component(b) in a block copolymer composition for a viscous adhesive can be determined in the case of a number average molecular weight ratio, i.e. component (b)/component (a), of 2.3 to 3.6.

Specific examples of the vinyl aromatic hydrocarbon compound of the polymer block A constituting the components (a) and (b) include styrene; alkylstyrene such as α-methylstyrene, p-methylstyrene, and p-tert-butylstyrene; alkoxystyrene such as p-methoxystyrene; and vinyl naphthalene; though not being particularly limited thereto. Among these, styrene is preferable as vinyl aromatic hydrocarbon. The vinyl aromatic hydrocarbon compounds may be used alone, or two or more thereof may be used in combination.

Specific examples of the conjugated diene compound of the polymer block B constituting the components (a) and (b) include 1,3-butadiene, 2-methyl-1,3-butadiene (isoprene), 2,3-dimethyl-1,3-butadiene, 1,3-pentadiene, and 1,3-hexadiene, though not being particularly limited as long as the diolefin has a conjugated double bond. Among these, 1,3-butadiene and isoprene are preferred as conjugated diene compound. The conjugated diene compounds may be used alone, or two or more thereof may be used in combination.

(Content Ratio of Block Copolymer)

The content ratio of each of the components in a block copolymer composition for a viscous adhesive is as follows. The content ratio of component (a) is 50 mass % or more and 90 mass % or less, and the content ratio of component (b) is 10 mass % or more and 50 mass % or less. With the components (a) and (b) having a number average molecular weight and a number average molecular weight ratio in the above-described range, a block copolymer composition for a viscous adhesive and a viscous adhesive composition having excellent tackiness, tack strength, solubility, coating properties, ejection stability, and surface skin quality can be obtained.

Regarding the content ratio of a block copolymer, preferably the content ratio of component (a) is more than 80 mass % and 90 mass % or less and the content ratio of component (b) is 10 mass % or more and less than 20 mass %; more preferably the content ratio of component (a) is more than 80 mass % and 88 mass % or less and the content ratio of component (b) is 12 mass % or more and less than 20 mass %; further more preferably the content ratio of component (a) is more than 80 mass % and 85 mass % or less and the content ratio of component (b) is 15 mass % or more and less than 20 mass %. With such content ratios of the block copolymers, the odor and the coloration of the block copolymer composition for a viscous adhesive after kneading tend to be more suppressed.

Among the block copolymer compositions for a viscous adhesive of the present embodiments, a block copolymer composition for a viscous adhesive including more than 80 mass % and 90 mass % or less of the component (a) having a number average molecular weight of 10,000 or more and 60,000 or less, and 10 mass % or more and less than 20 mass % of the component (b) having a number average molecular weight of more than 120,000 and 200,000 or less, tends to have less odor in preparing a viscous adhesive composition by melt kneading, with very little change in color of the viscous adhesive composition, in addition to the advantage effects of the present embodiments. Preferably the combination of the block copolymers includes more than 80 mass % and 88 mass % or less of the component (a) having a number average molecular weight of 25,000 or more and 60,000 or less and 12 mass % or more and less than 20 mass % of the component (b) having a number average molecular weight of 140,000 or more and 200,000 or less; more preferably more than 80 mass % and 85 mass % or less of the component (a) having a number average molecular weight of 40,000 or more and 60,000 or less and 15 mass % or more and less than 20 mass % of the component (b) having a number average molecular weight of 160,000 or more and 190,000 or less. With such content ratios of the block copolymers, the odor and the coloration of the block copolymer composition for a viscous adhesive after kneading tend to be more suppressed.

Regarding the content ratio of block copolymers, preferably the content ratio of component (a) is 50 mass % or more and 80 mass % or less and the content ratio of component (b) is 20 mass % or more and 50 mass % or less; more preferably the content ratio of component (a) is 55 mass % or more and 80 mass % or less and the content ratio of component (b) is 20 mass % or more and 45 mass % or less; further more preferably the content ratio of component (a) is 60 mass % or more and 75 mass % or less and the content ratio of component (b) is 25 mass % or more and 40 mass % or less. With such content ratios of the block copolymers, a superior solubility is achieved.

Among the block copolymer compositions for a viscous adhesive of the present embodiments, a block copolymer composition for a viscous adhesive comprising 50 mass % or more and 90 mass % or less of the component (a) having a number average molecular weight of 10,000 or more and 60,000 or less and 10 mass % or more and 50 mass % or less of the component (b) having a number average molecular weight of more than 160,000 and 200,000 or less tends to have superior solubility, superior ejection stability in coating with a viscous adhesive composition, and a more smooth surface skin, in addition to the advantageous effects of the present embodiments. A block copolymer composition for a viscous adhesive comprising 50 mass % or more and 80 mass % or less of the component (a) having a number average molecular weight of 10,000 or more and 60,000 or less, and 20 mass % or more and 50 mass % or less of the component (b) having a number average molecular weight of more than 160,000 and 200,000 or less is more preferred.

Preferably the combination of block copolymers includes 50 mass % or more and 80 mass % or less of the component (a) having a number average molecular weight of 40,000 or more and 60,000 or less and 20 mass % or more and 50 mass % or less of the component (b) having a number average molecular weight of more than 160,000 or more and 200,000 or less; more preferably 60 mass % or more and 80 mass % or less of the component (a) having a number average molecular weight of 45,000 or more and 60,000 or less and 20 mass % or more and 40 mass % or less of the component (b) having a number average molecular weight of 160,000 or more and 190,000 or less; and further more preferably 65 mass % or more and 80 mass % or less of the component (a) having a number average molecular weight of 45,000 or more and 60,000 or less and 20 mass % or more and 35 mass % or less of the component (b) having a number average molecular weight of 160,000 or more and 190,000 or less.

(Number Average Molecular Weight Ratio of Component (b) to Component (a))

The range of number average molecular weight ratio of the component (b) to the component (a) is 2.0 to 4.0, preferably 2.2 to 4.0 in the viewpoint of holding power, more preferably 2.3 to 3.6, further more preferably 2.5 to 3.5, most preferably 2.7 to 3.4. As described above, in the case of component (b) of tribranch block copolymer, the number average molecular weight ratio of the component (b) to the component (a) tends to be 2.3 to 3.6. With a number average molecular weight ratio of the component (b) to the component (a) in the range, a block copolymer composition for a viscous adhesive and a viscous adhesive composition tend to have excellent tackiness, tack strength, solubility, coating properties, ejection stability, and surface skin quality.

The number average molecular weight ratio can be calculated from the number average molecular weight of each the component (a) and the component (b). The number average molecular weight ratio of the component (b) to the component (a) can be obtained by the method described in the below-mentioned Examples.

(Content of Vinyl Aromatic Monomer Unit)

The content of the vinyl aromatic monomer unit in the block copolymer composition for a viscous adhesive of the present embodiments is 25 to 50 mass %, preferably 30 to 45 mass %, more preferably 35 to 40 mass %. With a content of the vinyl aromatic monomer unit in the block copolymer for a viscous adhesive of the present embodiments in the range, a block copolymer composition for a viscous adhesive and a viscous adhesive composition having excellent tackiness (loop tack) and tack strength can be obtained. In particular, with a content of the vinyl aromatic monomer unit of 25 mass % or more, a block copolymer composition for a viscous adhesive and a viscous adhesive composition excellent in tack strength can be obtained; with a content of 50 mass % or less, a block copolymer composition for a viscous adhesive and a viscous adhesive composition excellent in tackiness can be obtained. The content of vinyl aromatic monomer unit in the block copolymer for a viscous adhesive can be measured by the method described in the below-mentioned Examples.

(15 Mass % Toluene Solution Viscosity)

The 15 mass % toluene solution viscosity of the block copolymer composition for a viscous adhesive of the present embodiments is 10 to 40 mPa·s, preferably 15 to 35 mPa·s, more preferably 20 to 30 mPa·s. With a 15 mass % toluene solution viscosity of the block copolymer for a viscous adhesive of the present embodiments in the range, a block copolymer composition for a viscous adhesive and a viscous adhesive composition excellent in tackiness, tack strength, solubility, coating properties, ejection stability, and surface skin quality can be obtained. In particular, with a 15 mass % toluene solution viscosity of 10 mPa·s or more, a block copolymer composition for a viscous adhesive and a viscous adhesive composition excellent in tack strength can be obtained; with a 15 mass % toluene solution viscosity of 40 mPa·s or less, a block copolymer composition for a viscous adhesive and a viscous adhesive composition excellent in tackiness, solubility, coating properties, ejection stability, and surface skin quality can be obtained. The 15 mass % toluene solution viscosity of the block copolymer for a viscous adhesive can be measured by the method described in the below-mentioned Examples.

As the component (b) increases, a higher melt viscosity tends to be obtained. As the component (a) increases, a block copolymer composition for a viscous adhesive tends to have a lower melt viscosity with a low softening point and a low creep.

(Vinyl Bond Content of Conjugated Diene Compound)

The vinyl bond content of the conjugated diene compound in a block copolymer composition for a viscous adhesive of the present embodiments is preferably less than 20%, more preferably less than 18%, and further more preferably less than 15%. With a vinyl bond content of conjugated diene compound of less than 20%, properties excellent in thermal stability and weather resistance tend to be obtained.

In order to adjust the vinyl bond content in the conjugated diene compound of a block copolymer composition for a viscous adhesive, for example, ethers, tertiary amines, or the like may be used. More specifically, one or a mixture of two or more selected from ethylene glycol dimethyl ether, tetrahydrofuran, α-methoxytetrahydrofuran, N,N,N',N'-tetramethylethylenediamine, and the like. Preferably, these are fed into a polymerization solvent prior to the step of feeding the conjugated diene monomer.

The vinyl bond content may be obtained from, for example, measurement with a nuclear magnetic resonance apparatus (DPX-400, made by Bruker Japan Co., Ltd.), or calculation by Hampton method with an infrared spectrophotometer (device name: FT/IR-230, made by Jasco Corporation).

(Manufacturing Method of Block Copolymer Composition for a Viscous Adhesive)

The method for the block copolymer composition for a viscous adhesive of the present embodiments include, for example, the successive steps of polymerizing a vinyl aromatic hydrocarbon compound such as styrene in an inert hydrocarbon solvent with use of a polymerization initiator of organolithium compound, and performing a trifunctional coupling reaction of a diblock copolymer polymerized with a conjugated diene compound such as butadiene. On this occasion, the coupled polymer makes the component (b), while the remaining diblock copolymer makes the component (a) without being coupled. The content of the component (a) and the component (b) can be adjusted to the predetermined range by controlling the addition amount of coupling agent in the coupling reaction.

Alternatively, the block copolymer composition for a viscous adhesive may be obtained by a method including the successive steps of separately polymerizing components (a) and (b), and mixing the polymers.

The molecular weight of the components (a) and (b) can be adjusted by controlling the amount of initiator such as organolithium compound. After completion of the polymerization reaction, a coupling reaction is performed. Water, alcohol, acid or the like is added to deactivate active species. After separation of polymerization solvent by, for example, steam stripping, a drying step is performed to obtain the components (a) and (b).

Specific examples of the polymerization method of the components (a) and (b) include coordination polymerization, anionic polymerization, and cationic polymerization, though not being limited thereto. Among them, anionic polymerization is preferred, due to easy structure control.

A known manufacturing method of block copolymer components by anionic polymerization may be used without specific limitations. Specific examples of the method include a method described in Japanese Patent Publication No. 36-19286, Japanese Patent Publication No. 43-17979, Japanese Patent Publication No. 46-32415, Japanese Patent Publication No. 49-36975, Japanese Patent Publication No. 48-2423, Japanese Patent Publication No. 48-4106, Japanese Patent Publication No. 56-28925, Japanese Patent Laid-Open No. 59-166518, or Japanese Patent Laid-Open No. 60-186577.

Specific examples of the inert hydrocarbon solvent for use in the polymerization step of the components (a) and (b) include a hydrocarbon solvent such as an aliphatic hydrocarbon such as butane, pentane, hexane, isopentane, heptane, octane, and isooctane; an alicyclic hydrocarbon such as cyclopentane, methylcyclopentane, cyclohexane, methylcyclohexane, and ethylcyclohexane; and an aromatic hydrocarbon such as benzene, toluene, ethylbenzene and xylene, though not being particularly limited thereto. These may be used alone, or two or more thereof may be mixed for use.

Specific examples of the organolithium compound for use as initiator in the polymerization step of the components (a) and (b) include known compounds such as ethyl lithium, propyl lithium, n-butyl lithium, sec-butyl lithium, tert-butyl lithium, phenyl lithium, propenyl lithium, and hexyl lithium, though not being particularly limited thereto. In particular, n-butyl lithium and sec-butyl lithium are preferred. The organolithium compounds may be used alone, or a mixture of two or more thereof may be used.

The components (a) and (b) include unsaturated double bonds derived from a conjugated diene, a part of or the whole of which may be hydrogenated. The hydrogenation process may be performed by a known method, without specific limitations.

The components (a) and (b) can be obtained as a block copolymer represented by one of the following formulae:

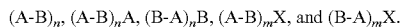

$(A-B)_n$, $(A-B)_nA$, $(B-A)_nB$, $(A-B)_mX$, and $(B-A)_mX$.

(In the formulae, A represents a polymer block mainly including a vinyl aromatic monomer unit, and B represents a polymer block mainly including a conjugated diene monomer unit. X represents the residue of a coupling agent, or the residue of a polymerization initiator. Further, n represents an integer of 1 or more, preferably an integer of 1 to 5, and m represents an integer of any of 2, 3 and 4.)

Among these, the block copolymer (a) represented by the formula (A-B) and the tribranch block copolymer (b) represented by the general formula $(A-B)_3X$ are preferred to be manufactured by the coupling reaction.

Specific examples of the coupling agent for use to obtain the tribranch block copolymer may include known ones including tin compounds such as methyl tin trichloride and tributyltin chloride; silane compounds such as trimethoxysilane, triethoxysilane, tetramethoxysilane, and tetraethoxysilane; silicon halide compounds such as methyl silicon trichloride and trimethylsilyl chloride.

Alternatively, a deactivating agent may be added in the middle of polymerizing the component (a) of a block copolymer, such that the component (a)' is contained. More specifically, after polymerization of a vinyl aromatic monomer unit, a deactivating agent in an amount to inactivate 50 mass % or less of the unit is added at any time during polymerization of the conjugated diene monomer unit, keeping from the whole inactivation, so that 20 mass % or less of a diblock copolymer represented by a general formula (A-B') may be contained in the block copolymer composition for a viscous adhesive. The B' represents a polymer block mainly including a conjugated diene monomer unit obtained by deactivation during polymerization. With inclusion of the diblock copolymer represented by the general formula (A-B'), the melt viscosity tends to be further reduced and the tack strength tends to be increased due to the high content ratio of styrene block.

The ratio of the amount (mass %) of polymer block of vinyl aromatic monomer to the total amount (mass %) of vinyl aromatic monomer unit for use in polymerizing polymer block (A) of vinyl aromatic monomer unit, i.e. the block ratio, is preferably 90% or more, more preferably 95% or more, and further more preferably 97% or more. With the preferable range, a block copolymer composition for a viscous adhesive having excellent finishing properties tends to be obtained, and a viscous adhesive composition which contains the block copolymer composition for a viscous adhesive tends to have excellent tack strength.

For measurement of the amount of polymer block of vinyl aromatic monomer, the block copolymer is dissolved in chloroform, to which an osmic acid/tert-butyl hydroperoxide solution is added, so that the double bond of butadiene component is opened. Subsequently, methanol is added to the solution, which is filtered. The residue is dissolved in chloroform. The peak intensity (absorption wavelength: 262 nm)

of the produced solution is measured with an ultraviolet spectrophotometer, from which the content of block styrene can be calculated.

In the manufacturing method of the block copolymer composition for a viscous adhesive of the present embodiments, a deashing step for removing metals derived from a polymerization initiator or the like may be employed on an as needed basis.

In the manufacturing method of the block copolymer composition for a viscous adhesive of the present embodiments, a step of adding an antioxidant, a neutralizing agent, a surfactant, or the like may be further employed on an as needed basis.

Specific examples of the antioxidants include hindered phenolic compounds, phosphorus compounds, and sulfur compounds which are the same ones described below, though not being particularly limited thereto.

Specific examples of the neutralizing agent include various metal stearate, hydrotalcite, and benzoic acid though not being particularly limited thereto.

Specific examples of the surfactant include an anionic surfactant, a nonionic surfactant, and a cationic surfactant, though not particularly limited thereto. Specific examples of the anionic surfactant include a fatty acid salt, an alkyl sulfate ester salt, and an alkyl aryl sulfonate salt, though not being particularly limited thereto. Specific examples of the nonionic surfactant include polyoxyethylene alkyl ether and polyoxyethylene alkyl aryl ether, though not being particularly limited thereto. Specific examples of the cationic surfactant include an alkyl amine salt and a quaternary ammonium salt, though not being particularly limited thereto.

The block copolymer composition for a viscous adhesive of the present embodiments, which can be manufactured as described above, may include: a so-called modified polymer including a polar group-containing functional group which includes an atom selected from nitrogen, oxygen, silicon, phosphorus, sulfur, and tin, combined with the block copolymer for a viscous adhesive; and a modified block copolymer of which the block copolymer component is modified with a modifier such as maleic anhydride. Such a modified copolymer can be obtained by a known modification reaction of the components (a) and (b).

After manufacturing of block copolymer components (a) and (b) for constituting the block copolymer for a viscous adhesive of the present embodiments as described above, the block polymer is isolated, or finished, by a method described below.

The polymerization step of the block copolymers (a) and (b) may be performed in an inert hydrocarbon solvent as described above. In order to isolate the block copolymers, the solvent is therefore removed. Specific examples of the method for removing the solvent include steam stripping. Hydrous crumbs are obtained by steam stripping. The obtained hydrous crumbs are dried to produce a block copolymer.

In steam stripping, use of a surfactant as crumbing agent is preferred. Specific examples of the surfactant include an anionic surfactant, a cationic surfactant, and a nonionic surfactant, though not being particularly limited thereto. These surfactants may be generally added in an amount of 0.1 to 3000 ppm to the water in a stripping zone.

In addition to the surfactant, a water-soluble salt of metal such as Li, Na, Mg, Ca, Al and Zn may be used as dispersing aid for the crumbs.

The concentration of dispersed block copolymer in a crumb form in water obtained through the steps of polymerizing a block copolymer and steam stripping is generally 0.1 to 20 mass % (the ratio relative to water in a stripping zone). With a concentration in the range, crumbs having a good particle diameter can be obtained without causing problems in carrying out the steps. The water content ratio of the crumbs of the block copolymer is adjusted to 1 to 30 mass % by dewatering, and preferably to 1 mass % or less by drying.

In the dewatering step of the crumbs, dewatering may be performed with a compression type water squeezing machine such as rolls, a Banbury-type dehydrator, and a screw extruder-type squeeze-dewatering machine, or dewatering and drying may be simultaneously performed with a conveyor and a box-type hot-air dryer.

In the case that the component (b) of the block copolymer to constitute the block copolymer composition for a viscous adhesive of the present embodiments contains a tribranch block copolymer in the range of 10 mass % or more and 50 mass % or less, drying tends to be smoothly performed without fusion bonding of the block copolymers to each other, or without adhesion to the conveyor surface or attachment to the wall surface of a box-type dryer, compared with the case that the component (b) contains tetra- or more-branch polyfunctional block copolymer.

(Adhesive Composition)
(Constitution)

The viscous adhesive composition of the present embodiments contains the above-mentioned block copolymer for a viscous adhesive, a below-mentioned tackifier, a below-mentioned softener, and below-mentioned other components on an as needed basis.

Preferably, the number average molecular weight of each the components (a) and (b) in a block copolymer composition is selected and the blending amount of the tackifier, the softener, and the like for each are adjusted, corresponding to applications.

The viscous adhesive composition of the present embodiments contains 100 parts by mass of the above-mentioned block copolymer composition for a viscous adhesive of the present embodiments, 100 to 400 parts by mass of a tackifier, and 50 to 150 parts by mass of a softener. The viscous adhesive composition of the present embodiments, thereby, has excellent tackiness, tack strength, solubility, coating properties, ejection stability, and surface skin quality. The amount of a tackifier is preferably 120 to 380 parts by mass, more preferably 150 to 350 parts by mass. The amount of a softener is preferably 70 to 130 parts by mass, more preferably 80 to 120 parts by mass.

(Tackifier)

A tackifier for constituting the viscous adhesive composition of the present embodiments can be selected in various ways corresponding to the applications and required performance of the viscous adhesive composition to be produced.

Specific examples of the tackifier include a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a three-dimensional polymer of a natural terpene, a hydrogenated derivative of a copolymer of a hydrogenated terpene, a polyterpene resin, a hydrogenated derivative of a phenolic modified terpene resin, an aliphatic petroleum hydrocarbon resin, a hydrogenated derivative of an aliphatic petroleum hydrocarbon resin, an aromatic petroleum hydrocarbon resin, a hydrogenated derivative of an aromatic petroleum hydrocarbon resin, a cyclic aliphatic petroleum hydrocarbon resin, a hydrogenated derivative of a cyclic aliphatic petroleum hydrocarbon resin, though not being particularly limited thereto. These tackifiers may be used alone or in combination.

As a tackifier, a liquid-type tackifier may be used as long as having a color tone of colorless to pale yellow and good thermal stability, substantially without odor.

Preferred examples of the tackifier other than hydrogenated derivatives include an aliphatic resin, an alicyclic resin, a polyterpene, a natural or modified rosin ester, and a mixture thereof, though not being particularly limited thereto. Specific examples include WINGTACK EXTRA (trade name) made by Sartomer, PICCOTAC (trade name) made by Eastman Chemical Co., ESCOREZ (trade name) made by Exxon Mobil Chemical Company, Ltd., SYLVAGUM (trade name) and SYLVALITE (trade name) made by Arizona Chemical, and PICCOLYTE (trade name) made by Ashland Inc.

In terms of the difficulty in coloring and the low-level odor, the tackifier is preferably a hydrogenated derivative. In particular, a hydrogenated dicyclopentadiene-based resin is preferred. Specific examples of such a hydrogenated derivative include ARKON P100 (trade name) and ARKON M115 (trade name) made by Arakawa Chemical Industries, Ltd., CLEARON P135 (trade name) made by Yasuhara Chemical Co., Ltd., and ECR5400 (trade name) made by Exxon Mobile Corporation, though not being particularly limited thereto.

According to need of a viscous adhesive composition having high adhesion, adhesion strength with aging resistance, or creep property (the smaller value the better), it is more preferred that 20 to 75 mass % of a tackifier having affinity for a block of non-glass phase of a block copolymer (usually an intermediate block) and 3 to 30 mass % of a tackifier having affinity for a block of glass phase of a block copolymer (usually outer block) are contained in the block copolymer composition for a viscous adhesive.

As the tackifier having affinity for a block of glass phase, a resin which provides an end block with tackiness is preferable. Examples of the tackifier include a resin mainly having an aromatic compound such as a homopolymer or a copolymer which contains vinyl toluene, styrene, α-methyl styrene, coumarone or indene. Among these, KRISTALEX and PLASTOLYN (trade names) made by Eastman Chemical Co., which include α-methyl styrene, are preferred. The usage amount of the agent to impart adhesion to an end block in a block copolymer composition for a viscous adhesive is preferably in the range of 3 to 30 mass %, more preferably in the range of 5 to 20 mass %, further more preferably in the range of 6 to 12 mass %.

According to need of a block copolymer composition for a viscous adhesive having high initial tack strength, high wettability, with low melt viscosity, excellent coating properties, and ejection stability of a viscous adhesive composition, preferably the tackifier for use in the composition is a petroleum resin having an aroma content of 3 to 12 mass %. An aroma content of 4 to 10 mass % is more preferable. In particular, a hydrogenated petroleum resin is preferred.

(Softener)

Examples of the softener for constituting the viscous adhesive composition of the present embodiments include an oil, a plasticizer, a liquid tackifier (having a ring and ball softening point lower than 30° C.), a synthetic liquid oligomer, and a mixtures thereof, though not being particularly limited thereto.

A known paraffin or naphthene based process oil, a mixed oil thereof, and the like may be used as a softener, without specific limitations.

Specific examples of commercially available products include DIANA FRESIA S32 (trade name), DIANA PROCESS OIL PW-90 (trade name), and PROCESS OIL NS100 (trade name) made by Idemitsu Kosan Co., Ltd., WHITE OIL BROOM 350 (trade name) and DN OIL KP-68 (trade name) made by Kukdong Oil & Chemicals Co., Ltd., ENERPER M1930 (trade name) made by BP Chemicals, KAYDOL (trade name) made by Crompton Corporation, PRIMOL 352 (trade name) made by ESSO, and KN 4010 (trade name) made by PetroChina Company, though not being particularly limited thereto.

(Other Components)

To the viscous adhesive composition of the present embodiments, an antioxidant, a synthetic rubber or polymer other than the block copolymer which constitutes the viscous adhesive composition of the present embodiments, a wax, a stabilizer such as light stabilizer, and other additives may be added on an as needed basis.

Specific examples of the antioxidant include: a hindered phenol based antioxidant such as 2,6-di-t-butyl-4-methylphenol, n-octadecyl-3-(4'-hydroxy-3',5'-di-t-butylphenyl)propionate, 2,2'-methylenebis(4-methyl-6-t-butylphenol), 2,2'-methylenebis(4-ethyl-6-t-butylphenol), 2,4-bis[(octylthio)methyl]-0-cresol, 2-t-butyl-6-(3-t-butyl-2-hydroxy-5-methylbenzyl)-4-methylphenyl acrylate, 2,4-di-t-amyl-6-[1-(3,5-di-t-amyl-2-hydroxyphenyl)ethyl]phenyl acrylate, and 2-[1-(2-hydroxy-3,5-di-tert-pentylphenyl)]acrylate; a sulfur based antioxidant such as dilauryl thiodipropionate, lauryl stearyl thiodipropionate, pentaerythritol tetrakis (β-laurylthiopropionate); and a phosphorus based antioxidant such as tris(nonylphenyl)phosphite and tris(2,4-di-t-butylphenyl) phosphite.

Specific examples of the commercially available antioxidant include SUMILIZER GM (trade name) SUMILIZER TPD (trade name) and SUMILIZER TPS (trade name) made by Sumitomo Chemical Co., Ltd., IRGANOX 1010 (trade name), IRGANOX HP2225FF (trade name), IRGAFOS 168 (trade name), and IRGANOX 1520 (trade name) made by Ciba Specialty Chemicals Inc., and JF77 (trade name) made by Johoku Chemical Co., Ltd. These stabilizers may be used alone or in combination.

The addition amount of antioxidant may be optionally determined, preferably 5 parts by mass or less relative to 100 parts by mass of the viscous adhesive composition.

Examples of the synthetic rubber or polymer other than the block copolymer for use in the present embodiments, which may be added without specific limitations, include: a polyolefin resin such as atactic polypropylene and ethylene-ethyl acrylate copolymer, or a low molecular weight vinyl aromatic-based thermoplastic resin; natural rubber; polyisoprene rubber; polybutadiene rubber; styrene-butadiene rubber; ethylene-propylene rubber; chloroprene rubber; acrylic rubber; isoprene-isobutylene rubber; polypentenamer rubber; and a synthetic rubber other than the block copolymer for use in the present embodiments such as a styrene-butadiene block copolymer, a styrene-isoprene block copolymer, a hydrogenated styrene-butadiene block copolymer, and a hydrogenated styrene-isoprene block copolymer.

According to need of a viscous adhesive composition having reduced adhesive deposit when detached, adhesion strength with aging resistance, or creep property (the smaller value the better), it is preferred to use a hydrogenated styrene block copolymer in combination. The styrene block copolymer has a styrene content preferably in the range of 15 mass % to 45 mass %. The unsaturated groups in the conjugated diene of the styrene block copolymer has a degree of hydrogenation of, preferably 30 mol % or more, more preferably 50 mol % or more, further more preferably 70 mol % or more, most preferably 85 mol % or more.

According to need of a viscous adhesive composition having high adhesion properties or suppressed gelling tendency, a block copolymer having isoprene other than the block copolymer for use in the present embodiments may be used in combination. Examples of the more preferable copolymer include: a copolymer having at least a polystyrene block and a polyisoprene block such as PS-PI-PS (PS: polystyrene block, PI: polyisoprene block); a copolymer having at least a polystyrene block, a polyisoprene block, and a polybutadiene block such as (PS-PI-PB)nY (PB: polybutadiene block, Y: residue of a polyfunctional coupling agent); or a copolymer having at least a polystyrene block and a polyisoprene/butadiene copolymer block such as PS-(PI/B)-PS (PI/B: isoprene/butadiene copolymer block). These having a radial structure are more preferred.

According to need of a viscous adhesive composition having high coating properties at low temperature, creep property (the smaller value the better), high strength or high degree of elongation, an ionomer in the range of 5 mass % or less may be used. Preferred examples of the ionomer include a polymer or a copolymer including a carboxylate, a sulfonate, or a phosphonate which is neutralized or partially neutralized with metal ions.

For a viscous adhesive composition having high-temperature storage stability, high degree of elongation, or a reduced amount of a tackifier in the block copolymer composition for a viscous adhesive (55 mass % or less, or even 45 mass % or less in the composition), preferably a copolymer made from α-olefin or a propylene homopolymer is contained. The melting point of these polymers (conditions: DSC measurement, 5° C./minute) is preferably 110° C. or lower, more preferably 100° C. or lower, further more preferably in the range of 60° C. to 90° C. These polymers may be a resin or an elastomer. The molecular weight distribution of these polymers is preferably in the range of 1 to 4, more preferably in the range of 1 to 3. In terms of processability, preferably a plurality of the polymers are used in combination. Preferably at least the polymers having a molecular weight of 30000 to 60000 and 60000 to 90000 are used in combination, more preferably at least the polymers having a molecular weight of 35000 to 55000 and 60000 to 80000 are used in combination. The composition with use of these has a content of liquid component (oil and the like) of preferably 20 mass % or more, more preferably 25 mass % or more.

According to need of a viscous adhesive composition having high degree of elongation and the like, preferably an olefin based elastomer is used in combination therewith. Preferably the olefin based elastomer has at least a Tg of −10° C. or lower. In terms of creep property (the smaller value the better), an olefin based elastomer having a block is more preferred.

Examples of the wax which may be added thereto include a paraffin wax, a microcrystalline wax, and a low molecular weight polyethylene wax, though not particularly limited thereto.

According to need of a viscous adhesive composition having a low melting viscosity, in particular, a low melting viscosity at 140° C. or lower, preferably at least a wax selected from a paraffin wax, a microcrystalline wax, and a Fischer-Tropsch wax in an amount of 2 to 10 mass %, having a melting point of 50° C. to 110° C., is contained. The content is more preferably in the range of 5 to 10 mass %. The melting point of the wax is preferably 65° C. or higher, more preferably 70° C. or higher, further more preferably 75° C. or higher. The softening point of the tackifier for use in combination is preferably 70° C. or higher, more preferably 80° C. or higher. Preferably the resulting composition has a G' (measurement conditions: 25° C., 10 rad/s) of 1 Mpa or less, and a crystallization temperature of 7° C. or lower.

Specific examples of the light stabilizer include a benzotriazole based ultraviolet absorber such as 2-(2'-hydroxy-5'-methylphenyl)benzotriazole, 2-(2'-hydroxy-3',5'-t-butylphenyl)benzotriazole, and 2-(2'-hydroxy-3',5'-di-t-butylphenyl)-5-chlorobenzotriazole, a benzophenone based ultraviolet absorber such as 2-hydroxy-4-methoxybenzophenone, or a hindered amine based light stabilizer, though not being particularly limited thereto.

The viscous adhesive composition of the present embodiments may further include a particulate filler as another additive. A commonly used particulate filler may be used without specific limitations, as long as an intended hot-melt adhesive of the present embodiments can be obtained. Examples of the "particulate filler" include mica, calcium carbonate, kaolin, talc, titanium oxide, diatomaceous earth, a urea resin, styrene beads, fired clay, and starch. Preferably these have a spherical shape, without any specific limitations on the dimension (diameter for spherical shape).

(Properties of Adhesive Composition)

An adhesive tape made from the viscous adhesive composition of the present embodiments has a loop tack (N/15 mm) of preferably 3.5 or more, more preferably 4.0 or more, further more preferably 4.5 or more, as a performance. The tack strength (N/10 mm) is preferably 8 or more, more preferably 8.7 or more, further more preferably 9.5 or more.

The performance of the adhesive tape made from the viscous adhesive composition of the present embodiments can be measured with use of an adhesive tape prepared under the conditions indicated in Examples to be described, under the measurement conditions indicated in Examples.

(Manufacturing Method of Adhesive Composition)

The viscous adhesive composition of the present embodiments may be manufactured by a known method of mixing the above-described block copolymer composition, a tackifier, a softener, and other additives on an as needed basis. Specific examples of the mixing method include a method of uniformly mixing the block copolymer composition, a tackifier, and a softener with a mixing machine of a kneader while heating, though not being particularly limited thereto.

The mixing temperature is preferably 130° C. to 210° C., more preferably 140° C. to 200° C., further more preferably 150° C. to 190° C. With a temperature of 130° C. or higher, the block copolymer composition for a viscous adhesive tends to be sufficiently melted for achieving good dispersion. With a temperature of 210° C. or lower, the evaporation of a cross-linking agent and low molecular weight components of the tackifier and the degradation of adhesion properties tend to be prevented.

The mixing time is preferably 5 to 90 minutes, more preferably 10 minutes to 80 minutes, further more preferably 20 minutes to 70 minutes. With a mixing time of 5 minutes or more, each the components tends to be uniformly dispersed. With a mixing time of 90 minutes or less, the evaporation of a cross-linking agent and low molecular weight components of the tackifier, the degradation of properties of the adhesion, and the degradation of the block copolymer tend to be prevented.

(Method for Applying Adhesive Composition)

Examples of the method for applying the viscous adhesive composition include a method for applying a solution dissolving the viscous adhesive composition in solvent, and a method for applying a hot melt of the viscous adhesive composition, though not being particularly limited thereto as long as an intended product can be obtained. From the viewpoints of environmental pollution and easiness in application, a method for applying a hot melt is preferred. The method for applying a hot melt is generally classified into a contact coating application and a non-contact coating application. The "contact coating application" means a method for applying a hot melt adhesive with an ejection device in contact with a member or a film. On the other hand, the "non-contact coating application" means a method for applying a hot melt adhesive with an ejection device not in contact with a member or a film. Examples of the contact coating application include a slot coater application and a roll coater application, though not being limited thereto. Examples of the non-contact coating application include a spiral coating application capable of a spiral application, an omega coating application and a control seam coating application capable of a wavy application, a slot spray coating application and a curtain spray coating application capable of application in a planar form, and a dot coating application capable of application in a dot form.

The viscous adhesive composition of the present embodiments is suitable for a spiral coating application. The spiral coating application is a non-contact coating application method for intermittently or continuously applying an adhesive in a spiral form with air. The capability of wide-width application of a hot melt adhesive by spray coating is very useful for manufacturing disposable products. A hot melt adhesive capable of wide-width application enables the coating application width to be adjusted to a narrower range through control of the pressure of hot air. The difficulty in wide-width application of a hot melt adhesive requires a large number of spray nozzles for obtaining sufficient adhesion area, which is unsuitable for manufacturing relatively small disposable products such as urine removal liners and disposable products having a complicated shape. Since the viscous adhesive composition of the present embodiments is capable of wide-width spiral coating application, the use for disposable products is suitable.

The viscous adhesive composition of the present embodiments is suitable for manufacturing disposable products, having good suitability for coating application at 150° C. or lower. Coating application of a hot melt adhesive at high temperature causes melting or thermal shrinkage of polyolefin (preferably polyethylene) film as substrate of a disposable product, resulting in significant damage to the appearance of the disposable product. Coating application of a hot melt adhesive at 150° C. or lower hardly causes changes in appearance of polyolefin (preferably polyethylene) film or non-woven cloth as substrate of a disposable product, resulting in no damage to the appearance of the disposable product.

The viscous adhesive composition of the present embodiments is suitable for manufacturing disposable products in a short time, having excellent adequacy for high-speed coating application. In coating application of a hot melt adhesive to a substrate transported at high speed, fracture of the substrate is caused by friction in some cases in a contact coating application method. The viscous adhesive composition of the present embodiments is suitable for spiral coating application, i.e. a kind of non-contact coating application method, being suited to a high-speed coating application. Consequently the production efficiency of disposable products can be improved. Furthermore, the hot melt adhesive of the present embodiments suitable for high-speed coating application causes no irregularity in a coating application pattern.

The viscous adhesive composition of the present embodiments has good thermal stability, being uniformly melted in a high-temperature tank at 100 to 200° C. without causing phase separation. A hot melt adhesive with poor thermal stability easily causes phase separation of components in a high-temperature tank. The phase separation can be a cause of the clogging of a tank filter or a transportation pipe line.

(Use Applications)

The viscous adhesive composition of the present embodiments has good solubility, coating properties, ejection stability, surface skin quality, and tackiness and tack strength with a good balance of these adhesive properties. Taking advantage of such characteristics, the composition can be used for various adhesive tapes/labels, adhesive thin plates, adhesive sheets, surface protective sheets/films, back adhesives for fixing various lightweight plastic moldings, back adhesives for fixing a carpet, back adhesives for fixing a tile, adhesives and the like, being particularly useful as viscous adhesive for adhesive tapes, adhesive sheets/films, adhesive labels, surface protective sheets/films, and sanitary materials.

EXAMPLES

Hereinafter, the present invention is described in detail with reference to specific Examples and Comparative Examples. However, the present invention is not limited to the following Examples. In the following Examples and Comparative Examples, the characteristics and physical properties of polymers were measured by the following methods.

(1) Characteristics of Block Copolymer Composition for a Viscous Adhesive

<(1-1) Finishing Properties of Block Copolymer Composition for a Viscous Adhesive>

After solvent removal of the following polymerization solution by steam stripping, hydrous crumbs were fed to a monoaxial screw extruder-type water squeezing machine so as to be dehydrated. After the dehydrated crumbs (block copolymer) were dried for 1 hour in a box-type hot air dryer at 85° C., the adhesion state between the block copolymer and the inner wall of the box of the hot air dryer was observed.

Evaluation Criteria

◯: State with no adhesion at all between the block copolymer and the inner wall of the box.

Δ: State with some adhesion, easily detached by hand.

x: State with firm adhesion between the block copolymer and the inner wall of the box, detached with significantly large force.

<(1-2) Content of Vinyl Aromatic Monomer Unit (Styrene)>

A predetermined amount of block copolymer was dissolved in chloroform for the measurement by ultraviolet spectrophotometer (UV-2450, made by Shimadzu Corp.). The content of vinyl aromatic monomer unit (styrene) was calculated from the peak intensity of absorption wavelength (262 nm) due to the vinyl aromatic compound component (styrene), with use of a calibration curve.

<(1-3) Number Average Molecular Weight>

The number average molecular weight of the component (a) and the component (b) was measured by gel permeation chromatography (GPC: apparatus made by Waters), using tetrahydrofuran as solvent, under measurement conditions at a temperature of 35° C. The number average molecular weight was obtained from the molecular weight at the peak of the chromatogram with use of a calibration curve (created by using a peak molecular weight of standard polystyrene) obtained from the measurement of commercially available standard polystyrene.

<(1-4) Ratio of Number Average Molecular Weight>

The ratio of number average molecular weight ((component (b)/component (a)) was calculated from the number average molecular weight of the component (a) and component (b) obtained as described above.

<(1-5) Content of Component (a) (Diblock Copolymer)>

In the chromatogram measured by the gel permeation chromatography (GPC: apparatus made by Waters), the ratio of the peak area for a lower molecular weight relative to the total peak area was assumed to be the content of the component (a) (diblock copolymer). The content of the component (b) can be obtained from the ratio of the area for a higher molecular weight.

<(1-6) Viscosity of 15 Mass % Toluene Solution>

The viscosity of 15 mass % toluene solution was measured in a constant temperature bath controlled at a temperature of 25° C., with use of a Cannon-Fenske viscometer.

(2) Measurement of Physical Properties of Adhesive Composition

<(2-1) Solubility of Adhesive Composition>

The change in torque of the pressure kneader (D 0.3-3 type kneader made by Moriyama Co., Ltd.) for use as mixing device was read. The time when the rate of change reached within 1% was assumed to be the time for dissolution.

Evaluation Criteria

○: Dissolution time of 30 minutes or less.

Δ: Dissolution time of more than 30 minutes and less than 60 minutes.

x: Dissolution time of 60 minutes or more.

<(2-2) Melt Viscosity of Adhesive Composition>

The melt viscosity of the viscous adhesive composition was measured with a Brookfield viscometer (DV-III, manufactured by Brookfield) at a temperature of 140° C.

<(2-3) Softening Point of Adhesive Composition>

The softening point of the viscous adhesive composition was measured in accordance with JIS-K2207. A specified ring was filled with a sample so as to be horizontally supported in water. A 3.5 g ball was placed at the center of the sample, and the liquid temperature was raised at a rate of 5° C./min. The temperature at which the sample contacted the bottom plate of the ring stand due to the weight of the ball was assumed to be the softening point.

<(2-4) Coating Properties>

The melted adhesive composition was dropped onto a hot plate heated at 160° C. After coating application with an applicator heated at 160° C., the coating surface of the adhesive was visually observed.

Evaluation Criteria

○: Irregularity of less than 10%.

Δ: Irregularity of 10% or more and less than 40%.

x: Irregularity of 40% or more.

<(2-5) Ejection Stability>

Using a capillary rheometer (trade name: CAPILLOGRAPH 1D, Model: PM-C, made by Toyo Seiki Seisaku-sho, Ltd.), the viscous adhesive composition was ejected under conditions at a temperature of 120° C. and an ejection rate of 100 mm/min for the measurement of the viscosity variation for 1 minute after 1 minute from the start of ejection. With a viscosity variation range of 5 mPa·s or less, the performance was determined to be excellent for practical use. With a viscosity variation range of 10 mPa·s or less, the performance was determined to be sufficient for practical use.

<(2-6) Surface Skin>

The surface state of the strand ejected in the evaluation of ejection stability was visually observed. The surface skin was evaluated as follows.

⊚: Not roughened at all.

○: Very slightly roughened.

Δ: Slightly roughened.

x: Fairly roughened.

With ⊚, the performance was determined to be excellent for practical use. With ○, the performance was determined to be sufficient for practical use.

(Preparation of Adhesive Tape)

A melted adhesive composition was cooled to room temperature and dissolved in toluene. The solution was applied to a polyester film with an applicator. The film was subject to room temperature for 30 minutes and 70° C. for 7 minutes in an oven for complete evaporation of toluene. A adhesive tape having a thickness of 50 μm was thus prepared.

<(2-7) Tackiness of Adhesive Composition (Loop Tack)>

Using a loop-shaped adhesive tape with a length of 250 mm and a width of 15 mm, the measurement was performed under conditions with a contact area to a PE (polyethylene) plate of 15 mm by 50 mm, an adhesion time of 3 seconds, and an adhesion and peeling rate of 500 mm/min. With a measured tackiness (N/15 mm) of 4.0 or more, the performance was determined to be excellent for practical use. With a measured tackiness (N/15 mm) of 3.5 or more, the performance was determined to be sufficient for practical use.

<(2-8) Tack Strength of Adhesive Composition>

The 180° peel strength of an adhesive tape having a width of 25 mm attached to a polyethylene plate was measured at a peeling rate of 300 mm/min, as tack strength. With a measured tack strength (N/10 mm) of 9.5 or more, the performance was determined to be excellent for practical use. With a measured tack strength (N/10 mm) of 8.0 or more, the performance was determined to be sufficient for practical use.

<(2-9) Holding Power of Adhesive Composition>

For evaluation of the holding power, the adhesive tape was attached to a stainless plate or a polyethylene plate, so as to have a contact area of 25 mm by 25 mm. Under a load of 1 kg at 40° C., the time until the adhesive tape slipped down was measured. With a measured holding power (minutes) of 180 or more, the performance was determined to be excellent for practical use. With a measured holding power (minutes) of 150 or more, the performance was determined to be sufficient for practical use.

<(2-10) Odor of Adhesive Composition>

In preparation of a viscous adhesive composition, the degree of odor generated in melt kneading under the conditions at a temperature of 180° C. and a rotating speed of kneading blades of 3,000 rpm was evaluated as follows.

⊚: No smelling at all.

○: Almost no smelling.

Δ: Slightly smelling.

x: Fairly smelling.

With ⊚, the performance was determined to be excellent for practical use. With ○, the performance was determined to be sufficient for practical use.

<(2-11) Color of Adhesive Composition after Kneading>

The color of a viscous adhesive composition prepared by melt kneading at a temperature of 180° C. and a rotating speed of kneading blades of 3,000 rpm, for an agitation time of 90 minutes was observed. With no color given to the viscous adhesive composition, the performance was determined to be excellent for practical use. With a pale yellow color, the performance was determined to be sufficient for practical use.

(3) Preparation of Block Copolymer

<Polymer Composition 1: Trifunctional Coupling Styrene-Butadiene Block Copolymer Composition>

A stainless steel autoclave having an internal capacity of 10 L with a stirrer and a jacket was washed, dried, purged with nitrogen, and charged with 6,300 g of cyclohexane, and 396 g of pre-purified styrene. Hot water was passed through the jacket for setting the content at about 40° C. Subsequently n-butyl lithium cyclohexane solution (2.6 g as pure content) was added thereto, so that the polymerization of styrene was initiated.

After 6 minutes a maximum temperature (53° C.) was obtained due to polymerization of styrene, 804 g of butadiene (1,3-butadiene) was added and the polymerization was continued. After 30 seconds a maximum temperature (89° C.) was obtained due to almost complete polymerization of butadiene, trimethoxysilane as coupling agent was added for coupling. After 10 minutes the coupling agent was added, 0.77 g of methanol was added for deactivation.

To 100 parts by mass of the block copolymer solution obtained, 0.3 parts by mass of octadecyl-3(3,5-dibutyl-t-butyl-4-hydroxyphenyl)propionate was added and sufficiently mixed. In steam stripping of the polymerization solution, a mixture of dihydrodiene phosphate ester and monohydrodiene phosphate ester of α-(p-nonylphenyl)-ω-hydroxy polyoxyethylene) was used as a crumbing agent in an amount of 30 ppm relative to the water in the stripping zone. The solvent was removed at a temperature of 90 to 98° C. The concentration of the polymer crumbs in slurry in a solvent removing tank was about 5 mass %.

The aqueous dispersion slurry in a crumb form thus obtained was then sent to a rotary screen, so that hydrous crumbs with a water content of 45 mass % were obtained. The hydrous crumbs were sent to a monoaxial screw extruder-type water squeezing machine, so that a dehydrated polymer was obtained. The crumbs were dried at 85° C. in a box type hot air dryer for 1 hour, so that a block copolymer composition for a viscous adhesive (polymer composition 1) was obtained.

The content of styrene in the polymer composition 1 was 38.1 mass % relative to the total of the polymer composition 1, and the viscosity of the 15 mass % toluene solution was 24.6 mPa·s.

The polymer composition 1 is including a mixture of the component (b): ((A-B)$_3$X) and the component (a): (A-B). The component (a) had a number average molecular weight of 48,000, and the component (b) had a number average molecular weight of 159,000. The content ratio of a block copolymer having a diblock structure of styrene-butadiene corresponding to the component (a) was 67.1 mass %, and the content ratio of a trifunctional coupling styrene-butadiene block copolymer corresponding to the component (b) was 32.9 mass %.

<Polymer Composition 2: Difunctional Coupling Styrene-Butadiene Block Copolymer Composition>

A block copolymer composition for a viscous adhesive (polymer composition 2) was obtained by the same method of polymerization, deactivation, addition of stabilizers, steam stripping, dehydration and drying as in the case of the polymer composition 1, except that the charged amount of purified styrene was changed to 444 g, the addition amount of n-butyl lithium cyclohexane solution was changed to 2.5 g as purity content, the addition amount of butadiene (1,3-butadiene) was changed to 756 g, ethyl benzoate was added as coupling agent, and the amount of ethanol for deactivation was changed to 0.62 g.

The content of styrene in the polymer composition 2 was 36.6 mass % relative to the total of the polymer composition 2, and the viscosity of 15 mass % toluene solution was 31.5 mPa·s.

The polymer composition 2 is including a mixture of ((A-B)$_2$X) and (A-B). The (A-B) had a number average molecular weight of 51,000, and the ((A-B)$_2$X) had a number average molecular weight of 97,000. The content ratio of a block copolymer (A-B) was 52.9 mass %, and the content ratio of a block copolymer ((A-B)$_2$X) was 47.1 mass %.

<Polymer Composition 3: Tetrafunctional Coupling Styrene-Butadiene Block Copolymer Composition>

A block copolymer composition for a viscous adhesive (polymer composition 3) was obtained by the same method of polymerization, deactivation, addition of stabilizers, steam stripping, dehydration and drying as in the case of the polymer composition 1, except that the charged amount of purified styrene was changed to 380 g, the addition amount of n-butyl lithium cyclohexane solution was changed to 3.52 g as purity content, the addition amount of butadiene (1,3-butadiene) was changed to 820 g, silicon tetrachloride was added as coupling agent, and deactivation was performed by extraction into ethanol water.

The content of styrene in the polymer composition 3 was 35.6 mass % relative to the total of the polymer composition 3, and the viscosity of 15 mass % toluene solution was 26.5 mPa·s.

The polymer composition 3 is including a mixture of ((A-B)$_4$X) and (A-B). The (A-B) had a number average molecular weight of 34,000, and the ((A-B)$_4$X) had a number average molecular weight of 139,000. The content ratio of a block copolymer (A-B) was 63.5 mass %, and the content ratio of a block copolymer ((A-B)$_4$X) was 36.5 mass %.

<Polymer Composition 4: Trifunctional Coupling Styrene-Butadiene Block Copolymer Composition>

A block copolymer composition for a viscous adhesive (polymer composition 4) was obtained by the same method of polymerization, deactivation, addition of stabilizers, steam stripping, dehydration and drying as in the case of the polymer composition 1, except that the charged amount of purified styrene was changed to 300 g, the addition amount of n-butyl lithium cyclohexane solution was changed to 2.4 g as purity content, the addition amount of butadiene (1,3-butadiene) was changed to 900 g, the addition amount of ethanol for deactivation was changed to 0.71 g.

The content of styrene in the polymer composition 4 was 22.4 mass % relative to the total of the polymer composition 4, and the viscosity of 15 mass % toluene solution was 33.2 mPa·s.

The polymer composition 4 is including a mixture of the component (b): ((A-B)$_3$X) and the component (a): (A-B). The component (a) had a number average molecular weight of 54,000, and the component (b) had a number average molecular weight of 178,000. The content ratio of a block copolymer having a diblock structure of styrene-butadiene corresponding to the component (a) was 56.3 mass %, and the content ratio of a trifunctional coupling styrene-butadiene block copolymer corresponding to the component (b) was 43.7 mass %.

<Polymer Composition 5: Trifunctional Coupling Styrene-Butadiene Block Copolymer Composition>

A block copolymer composition for a viscous adhesive (polymer composition 5) was obtained by the same method of polymerization, deactivation, addition of stabilizers, steam stripping, dehydration and drying as in the case of the polymer composition 1, except that the charged amount of styrene was changed to 360 g, the addition amount of n-butyl lithium cyclohexane solution was changed to 2.5 g as purity content, the addition amount of butadiene (1,3-butadiene) was changed to 840 g, coupling agent was changed to tetraethoxysilane, and the addition amount of ethanol for deactivation was changed to 0.74 g.

The content of styrene in the polymer composition 5 was 29.7 mass % relative to the total of the polymer composition 5, and the viscosity of 15 mass % toluene solution was 32.5 mPa·s.

The polymer composition 5 is including a mixture of the component (b): ((A-B)$_3$X) and the component (a): (A-B). The component (a) had a number average molecular weight of 50,000, and the component (b) had a number average molecular weight of 165,000. The content ratio of a block copolymer having a diblock structure of styrene-butadiene corresponding to the component (a) was 59.2 mass %, and the content ratio of a trifunctional coupling styrene-butadiene block copolymer corresponding to the component (b) was 40.8 mass %.

<Polymer Composition 6: Trifunctional Coupling Styrene-Butadiene Block Copolymer Composition>

A block copolymer composition for a viscous adhesive (polymer composition 6) was obtained by the same method of polymerization, deactivation, addition of stabilizers, steam stripping, dehydration and drying as in the case of the polymer composition 1, except that the charged amount of styrene was changed to 540 g, the addition amount of n-butyl lithium cyclohexane solution was changed to 2.8 g as purity content, the addition amount of butadiene (1,3-butadiene) was changed to 660 g, and the addition amount of ethanol for deactivation was changed to 0.83 g.

The content of styrene in the polymer composition 6 was 45.3 mass % relative to the total of the polymer composition 6, and the viscosity of 15 mass % toluene solution was 22.1 mPa·s.

The polymer composition 6 is including a mixture of the component (b): ((A-B)$_3$X) and the component (a): (A-B). The component (a) had a number average molecular weight of 45,000, and the component (b) had a number average molecular weight of 148,000. The content ratio of a block copolymer having a diblock structure of styrene-butadiene corresponding to the component (a) was 70.6 mass %, and the content ratio of a trifunctional coupling styrene-butadiene block copolymer corresponding to the component (b) was 29.4 mass %.

<Polymer Composition 7: Trifunctional Coupling Styrene-Butadiene Block Copolymer Composition>

A block copolymer composition for a viscous adhesive (polymer composition 7) was obtained by the same method of polymerization, deactivation, addition of stabilizers, steam stripping, dehydration and drying as in the case of the polymer composition 1, except that the charged amount of styrene was changed to 660 g, the addition amount of n-butyl lithium cyclohexane solution was changed to 3.3 g as purity content, the addition amount of butadiene (1,3-butadiene) was changed to 540 g, and the amount of ethanol for deactivation was changed to 1.00 g.

The content of styrene in the polymer composition 7 was 54.8 mass % relative to the total of the polymer composition 7, and the viscosity of 15 mass % toluene solution was 20.7 mPa·s.

The polymer composition 7 is including a mixture of the component (b): ((A-B)$_3$X) and the component (a): (A-B). The component (a) had a number average molecular weight of 36,000, and the component (b) had a number average molecular weight of 120,000. The content ratio of a block copolymer having a diblock structure of styrene-butadiene corresponding to the component (a) was 75.0 mass %, and the content ratio of a trifunctional coupling styrene-butadiene block copolymer corresponding to the component (b) was 25.0 mass %.

<Polymer Composition 8: Trifunctional Coupling Styrene-Butadiene Block Copolymer Composition>

A block copolymer composition for a viscous adhesive (polymer composition 8) was obtained by the same method of polymerization, deactivation, addition of stabilizers, steam stripping, dehydration and drying as in the case of polymer composition 1, except that the charged amount of styrene was changed to 414 g, the addition amount of n-butyl lithium cyclohexane solution was changed to 2.5 g as purity content, the addition amount of butadiene (1,3-butadiene) was changed to 786 g, 0.25 g of ethanol was added after 2 minutes of polymerization initiation of butadiene for deactivation of a part of block copolymers with polymerization continuing, and the addition amount of ethanol for deactivation was changed to 0.62 g.

The content of styrene in the polymer composition 8 was 34.9 mass % relative to the total of the polymer composition 8, and the viscosity of 15 mass % toluene solution was 29.7 mPa·s.

The polymer composition 8 is including a mixture of the component (b): ((A-B)$_3$X), the component (a): (A-B), and the component deactivated in the middle: (A-B'). The component (a) had a number average molecular weight of 58,000, and the component (b) had a number average molecular weight of 185,000. The content ratio of the block copolymer having a diblock structure of styrene-butadiene corresponding to the component (a) was 64.5 mass %, the content ratio of the block copolymer deactivated in the middle having a diblock structure of styrene-butadiene was 8.5 mass %, and the content ratio of the trifunctional coupling styrene-butadiene block copolymer corresponding to the component (b) was 27.0 mass %.

<Polymer Composition 9: Trifunctional Coupling Styrene-Butadiene Block Copolymer Composition>

A block copolymer composition for a viscous adhesive (polymer composition 9) was obtained by the same method of polymerization, deactivation, addition of stabilizers, steam stripping, dehydration and drying as in the case of polymer composition 1, except that the charged amount of styrene was changed to 576 g, the addition amount of n-butyl lithium cyclohexane solution was changed to 5.0 g as purity content, the addition amount of butadiene (1,3-butadiene) was changed to 624 g, and the addition amount of ethanol for deactivation was changed to 1.50 g.

The content of styrene in the polymer composition 9 was 47.8 mass % relative to the total of the polymer composition 9, and the viscosity of 15 mass % toluene solution was 8.8 mPa·s.

The polymer composition 9 is including a mixture of the component (b): ((A-B)$_3$X) and the component (a): (A-B). The component (a) had a number average molecular weight of 20,000, and the component (b) had a number average molecular weight of 67,000. The content ratio of a block copolymer having a diblock structure of styrene-butadiene corresponding to the component (a) was 51.8 mass %, and the content ratio of a trifunctional coupling styrene-butadiene block copolymer corresponding to the component (b) was 48.2 mass %.

<Polymer Composition 10: Trifunctional Coupling Styrene-butadiene Block Copolymer Composition>

A block copolymer composition for a viscous adhesive (polymer composition 10) was obtained by the same method of polymerization, deactivation, addition of stabilizers, steam stripping, dehydration and drying as in the case of the polymer composition 1, except that the charged amount of styrene was changed to 540 g, the addition amount of n-butyl lithium cyclohexane solution was changed to 3.9 g as purity content, the addition amount of butadiene (1,3-butadiene) was changed to 660 g, and the amount of ethanol for deactivation was changed to 1.17 g.

The content of styrene in the polymer composition 10 was 45.1 mass % relative to the total of the polymer composition 10, and the viscosity of 15 mass % toluene solution was 14.5 mPa·s.

The polymer composition 10 is including a mixture of the component (b): ((A-B)$_3$X) and the component (a): (A-B). The component (a) had a number average molecular weight of 30,000, and the component (b) had a number average molecular weight of 99,000. The content ratio of a block copolymer having a diblock structure of styrene-butadiene corresponding to the component (a) was 58.2 mass %, and the content ratio of a trifunctional coupling styrene-butadiene block copolymer corresponding to the component (b) was 41.8 mass %.

<Polymer Composition 11: Trifunctional Coupling Styrene-butadiene Block Copolymer Composition>

A block copolymer composition for a viscous adhesive (polymer composition 11) was obtained by the same method of polymerization, deactivation, addition of stabilizers, steam stripping, dehydration and drying as in the case of the polymer composition 1, except that the charged amount of styrene was changed to 420 g, the addition amount of n-butyl lithium cyclohexane solution was changed to 2.3 g as purity content, the addition amount of butadiene (1,3-butadiene) was changed to 780 g, and the amount of ethanol for deactivation was changed to 0.68 g.

The content of styrene in the polymer composition 11 was 35.1 mass % relative to the total of the polymer composition 11, and the viscosity of 15 mass % toluene solution was 33.5 mPa·s.

The polymer composition 11 is including a mixture of the component (b): ((A-B)$_3$X) and the component (a): (A-B). The component (a) had a number average molecular weight of 59,000, and the component (b) had a number average molecular weight of 195,000. The content ratio of a block copolymer having a diblock structure of styrene-butadiene corresponding to the component (a) was 67.5 mass %, and the content ratio of a trifunctional coupling styrene-butadiene block copolymer corresponding to the component (b) was 32.5 mass %.

<Polymer Composition 12: Trifunctional Coupling Styrene-Butadiene Block Copolymer Composition>

A block copolymer composition for a viscous adhesive (polymer composition 12) was obtained by the same method of polymerization, deactivation, addition of stabilizers, steam stripping, dehydration and drying as in the case of the polymer composition 1, except that the charged amount of styrene was changed to 324 g, the addition amount of n-butyl lithium cyclohexane solution was changed to 2.2 g as purity content, the addition amount of butadiene (1,3-butadiene) was changed to 876 g, and the amount of ethanol for deactivation was changed to 0.66 g.

The content of styrene in the polymer composition 12 was 26.9 mass % relative to the total of the polymer composition 12, and the viscosity of 15 mass % toluene solution was 44.7 mPa·s.

The polymer composition 12 is including a mixture of ((A-B)$_3$X) and (A-B). (A-B) had a number average molecular weight of 69,000, and ((A-B)$_3$X) had a number average molecular weight of 228,600. The content ratio of a block copolymer (A-B) was 76.0 mass %, and the content ratio of ((A-B)$_3$X) was 24.0 mass %.

<Polymer Composition 13: Trifunctional Coupling Styrene-butadiene Block Copolymer Composition>

A block copolymer composition for a viscous adhesive (polymer composition 13) was obtained by the same method of polymerization, deactivation, addition of stabilizers, steam stripping, dehydration and drying as in the case of the polymer composition 1, except that the charged amount of styrene was changed to 360 g, the addition amount of n-butyl lithium cyclohexane solution was changed to 3.7 g as purity content, the addition amount of butadiene (1,3-butadiene) was changed to 840 g, and the amount of ethanol for deactivation was changed to 1.11 g.

The content of styrene in the polymer composition 13 was 30.2 mass % relative to the total of the polymer composition 13, and the viscosity of 15 mass % toluene solution was 20.1 mPa·s.

The polymer composition 13 is including a mixture of the component (b): ((A-B)$_3$X) and the component (a): (A-B). The component (a) had a number average molecular weight of 32,000, and the component (b) had a number average molecular weight of 106,000. The content ratio of a block copolymer having a diblock structure of styrene-butadiene corresponding to the component (a) was 45.6 mass %, and the content ratio of a trifunctional coupling styrene-butadiene block copolymer corresponding to the component (b) was 54.4 mass %.

<Polymer Composition 14: Trifunctional Coupling Styrene-Butadiene Block Copolymer Composition>

A block copolymer composition for a viscous adhesive (polymer composition 14) was obtained by the same method of polymerization, deactivation, addition of stabilizers, steam stripping, dehydration and drying as in the case of the polymer composition 1, except that the charged amount of styrene was changed to 408 g, the addition amount of n-butyl lithium cyclohexane solution was changed to 4.4 g as purity content, the addition amount of butadiene (1,3-butadiene) was changed to 792 g, coupling agent was changed to tetraethoxysilane, and the addition amount of ethanol for deactivation was changed to 1.32 g.

The content of styrene in the polymer composition 14 was 34.0 mass % relative to the total of the polymer composition 14, and the viscosity of 15 mass % toluene solution was 24.9 mPa·s.

The polymer composition 14 is including a mixture of the component (b): ((A-B)$_3$X) and the component (a): (A-B). The component (a) had a number average molecular weight of 45,000, and the component (b) had a number average molecular weight of 146,000. The content ratio of a block copolymer having a diblock structure of styrene-butadiene corresponding to the component (a) was 55.0 mass %, and the content ratio of a trifunctional coupling styrene-butadiene block copolymer corresponding to the component (b) was 45.0 mass %.

<Polymer Composition 15: Trifunctional Coupling Styrene-butadiene Block Copolymer Composition>

A block copolymer composition for a viscous adhesive (polymer composition 15) was obtained by the same method of polymerization, deactivation, addition of stabilizers, steam stripping, dehydration and drying as in the case of the polymer composition 1, except that the charged amount of styrene was changed to 480 g, the addition amount of n-butyl lithium cyclohexane solution was changed to 2.4 g as purity content, the addition amount of butadiene (1,3-butadiene) was changed to 720 g, and the amount of ethanol for deactivation was changed to 0.72 g.

The content of styrene in the polymer composition 15 was 40.2 mass % relative to the total of the polymer composition 15, and the viscosity of 15 mass % toluene solution was 30.1 mPa·s.

The polymer composition 15 is including a mixture of the component (b): ((A-B)$_3$X) and the component (a): (A-B). The component (a) had a number average molecular weight of 58,000, and the component (b) had a number average molecular weight of 192,000. The content ratio of a block copolymer having a diblock structure of styrene-butadiene corresponding to the component (a) was 75.5 mass %, and the content ratio of a trifunctional coupling styrene-butadiene block copolymer corresponding to the component (b) was 24.5 mass %.

<Polymer Composition 16: Trifunctional Coupling Styrene-butadiene Block Copolymer Composition>

A block copolymer composition for a viscous adhesive (polymer composition 16) was obtained by the same method of polymerization, deactivation, addition of stabilizers, steam stripping, dehydration and drying as in the case of the polymer composition 1, except that the charged amount of styrene was changed to 540 g, the addition amount of n-butyl lithium cyclohexane solution was changed to 2.20 g as purity content, the addition amount of butadiene (1,3-butadiene) was changed to 660 g, and the amount of ethanol for deactivation was changed to 0.66 g.

The content of styrene in the polymer composition 16 was 45.1 mass % relative to the total of the polymer composition 16, and the viscosity of 15 mass % toluene solution was 37.5 mPa·s.

The polymer composition 16 is including a mixture of ((A-B)$_3$X) and (A-B). (A-B) had a number average molecular weight of 68,000, and ((A-B)$_3$X) had a number average molecular weight of 225,000. The content ratio of a block copolymer (A-B) was 84.5 mass %, and the content ratio of ((A-B)$_3$X) was 15.5 mass %.

<Polymer Composition 17: Trifunctional Coupling Styrene-butadiene Block Copolymer Composition>

A block copolymer composition for a viscous adhesive (polymer composition 17) was obtained by the same method of polymerization, deactivation, addition of stabilizers, steam stripping, dehydration and drying as in the case of the polymer composition 1, except that the charged amount of styrene was changed to 464 g, the addition amount of n-butyl lithium cyclohexane solution was changed to 2.36 g as purity content, the addition amount of butadiene (1,3-butadiene) was changed to 736 g, and the amount of ethanol for deactivation was changed to 0.765 g.

The content of styrene in the polymer composition 17 was 38.5 mass % relative to the total of the polymer composition 17, and the viscosity of 15 mass % toluene solution was 35.3 mPa·s.

The polymer composition 17 is including a mixture of ((A-B)$_3$X) and (A-B). (A-B) had a number average molecular weight of 51,000, and ((A-B)$_3$X) had a number average molecular weight of 166,700. The content ratio of a block copolymer (A-B) was 83.0 mass %, and the content ratio of ((A-B)$_3$X) was 17 mass %.

<Polymer Composition 18: Trifunctional Coupling Styrene-butadiene Block Copolymer Composition>

A block copolymer composition for a viscous adhesive (polymer composition 18) was obtained by the same method of polymerization, deactivation, addition of stabilizers, steam stripping, dehydration and drying as in the case of the polymer composition 1, except that the charged amount of styrene was changed to 520 g, the addition amount of n-butyl lithium cyclohexane solution was changed to 2.46 g as purity content, the addition amount of butadiene (1,3-butadiene) was changed to 680 g, coupling agent was changed to tetraethoxysilane, and the amount of ethanol for deactivation was changed to 0.728 g.

The content of styrene in the polymer composition 18 was 43.2 mass % relative to the total of the polymer composition 18, and the viscosity of 15 mass % toluene solution was 12.5 mPa·s.

The polymer composition 18 is including a mixture of ((A-B)$_3$X) and (A-B). (A-B) had a number average molecular weight of 50,000, and ((A-B)$_3$X) had a number average molecular weight of 165,000. The content ratio of a block copolymer (A-B) was 91.0 mass %, and the content ratio of ((A-B)$_3$X) was 9 mass %.

<Polymer Composition 19: Trifunctional Coupling Styrene-butadiene Block Copolymer Composition>

A block copolymer composition for a viscous adhesive (polymer composition 19) was obtained by the same method of polymerization, deactivation, addition of stabilizers, steam stripping, dehydration and drying as in the case of the polymer composition 1, except that the charged amount of styrene was changed to 475 g, the addition amount of n-butyl lithium cyclohexane solution was changed to 2.84 g as purity content, the addition amount of butadiene (1,3-butadiene) was changed to 725 g, and the amount of ethanol for deactivation was changed to 0.796 g.

The content of styrene in the polymer composition 19 was 39.4 mass % relative to the total of the polymer composition 19, and the viscosity of 15 mass % toluene solution was 12.3 mPa·s.

The polymer composition 19 is including a mixture of ((A-B)$_3$X) and (A-B). (A-B) had a number average molecular weight of 40,000, and ((A-B)$_3$X) had a number average molecular weight of 134,000. The content ratio of a block copolymer (A-B) was 85.8 mass %, and the content ratio of ((A-B)$_3$X) was 14.2 mass %.

<Polymer Composition 20: Trifunctional Coupling Styrene-butadiene Block Copolymer Composition>

A block copolymer composition for a viscous adhesive (polymer composition 20) was obtained by the same method of polymerization, deactivation, addition of stabilizers, steam stripping, dehydration and drying as in the case of the polymer composition 1, except that the charged amount of styrene was changed to 418 g, the addition amount of n-butyl lithium cyclohexane solution was changed to 2.13 g as purity content, the addition amount of butadiene (1,3-butadiene) was changed to 782 g, and the amount of ethanol for deactivation was changed to 0.632 g.

The content of styrene in the polymer composition 20 was 34.5 mass % relative to the total of the polymer composition 20, and the viscosity of 15 mass % toluene solution was 48.3 mPa·s.

The polymer composition 20 is including a mixture of ((A-B)$_3$X) and (A-B). (A-B) had a number average molecular weight of 64,000, and ((A-B)$_3$X) had a number average molecular weight of 210,000. The content ratio of a block copolymer (A-B) was 65.5 mass %, and the content ratio of ((A-B)$_3$X) was 34.5 mass %.

<Polymer Composition 21: Trifunctional Coupling Styrene-butadiene Block Copolymer Composition>

A block copolymer composition for a viscous adhesive (polymer composition 21) was obtained by the same method of polymerization, deactivation, addition of stabilizers, steam stripping, dehydration and drying as in the case of the polymer composition 1, except that the charged amount of styrene was changed to 410 g, the addition amount of n-butyl lithium cyclohexane solution was changed to 2.46 g as purity content, the addition amount of butadiene (1,3-butadiene) was changed to 790 g, and the amount of ethanol for deactivation was changed to 0.730 g.

The content of styrene in the polymer composition 21 was 33.5 mass % relative to the total of the polymer composition 21, and the viscosity of 15 mass % toluene solution was 43.1 mPa·s.

The polymer composition 21 is including a mixture of ((A-B)$_3$X) and (A-B). (A-B) had a number average molecular weight of 51,000, and ((A-B)$_3$X) had a number average molecular weight of 170,000. The content ratio of a block copolymer (A-B) was 48.0 mass %, and the content ratio of ((A-B)$_3$X) was 52.0 mass %.

The physical properties of the polymer composition 1 to the polymer composition 21 are summarized in the following Table 1.

Example 1

A mixture with a blending ratio of 300 parts by mass of ARKON M100 (made by Arakawa Chemical Industries, Ltd.) as a tackifier and 100 parts by mass of DIANA PROCESS OIL PW-90 (made by Idemitsu Kosan Co., Ltd.) as a softener relative to 100 parts by mass of a block copolymer composition (polymer composition 1) was melt kneaded at 180° C. for 30 minutes with a double-arm-type pressure kneader (model: D 0.3-3, made by Moriyama Co., Ltd.), so that a uniform hot melt type adhesive composition having a pale yellow color was obtained.

The viscous adhesive composition included 1 part by mass of 2-t-butyl-6-(3-t-butyl-2-hydroxy-5-methylbenzyl)-4-methylphenylacrylate as a stabilizer relative to 100 parts by mass of the block copolymer composition (polymer composition 1).

As the results of measurement in accordance with the above-mentioned methods for measuring physical properties of a viscous adhesive composition, the melt viscosity (at 140° C.) was 1,320 mPa·s, and the softening point was 79.6° C. Further, the coating property, ejection stability, and surface skin quality were good. The loop tack was 4.6 N/15 mm, and the tack strength was 10.4 N/10 mm, which were practically good.

Examples 2 to 9

Comparative Examples 1 to 12

Reference Examples 1 to 4

In accordance with the blending as shown in the following Tables 2 to 5, each of the viscous adhesive compositions was prepared by the same procedure as in Example 1, using each of the block copolymer compositions (polymer compositions 2 to 21), ARKON M100 as a tackifier, and DIANA PROCESS OIL PW-90 as a softener. The characteristics of each were evaluated. In the case that the torque was not stabilized in kneading for 30 minutes, the kneading was continued until stabilization of the torque.

TABLE 1

| | | Polymer composition | | | | | | | |
|---|---|---|---|---|---|---|---|---|---|
| | | 1 | 2 | 3 | 4 | 5 | 6 | 7 | 8 |
| Structure of component (b) | | Trifunctional Cup | Difunctional Cup | Tetrafunctional Cup | Trifunctional Cup | Trifunctional Cup | Trifunctional Cup | Trifunctional Cup | Trifunctional Cup |
| Amount of styrene (mass %) | | 38.1 | 36.6 | 35.6 | 22.4 | 29.7 | 45.3 | 54.8 | 34.9 |
| Viscosity of 15% toluene solution (mPa·s) | | 24.6 | 31.5 | 26.5 | 33.2 | 32.5 | 22.1 | 20.7 | 29.7 |
| Content of component (a) (%) | | 67.1 | 52.9 | 63.5 | 56.3 | 59.2 | 70.6 | 75 | 73.0 (8.5/64.5) |
| Number average molecular weight (ten thousands) | Component (b) | 15.9 | 9.7 | 13.9 | 17.8 | 16.5 | 14.8 | 12 | 18.5 |
| | Component (a) | 4.8 | 5.1 | 3.4 | 5.4 | 5 | 4.5 | 3.6 | 5.8 |
| Number average molecular weight ratio | | 3.313 | 1.902 | 4.088 | 3.296 | 3.3 | 3.289 | 3.333 | 3.19 |

| | | Polymer composition | | | | | | | |
|---|---|---|---|---|---|---|---|---|---|
| | | 9 | 10 | 11 | 12 | 13 | 14 | 15 | 16 |
| Structure of component (b) | | Trifunctional Cup | Trifunctional Cup | Trifunctional Cup | Trifunctional Cup | Trifunctional Cup | Trifunctional Cup | Trifunctional Cup | Trifunctional Cup |
| Amount of styrene (mass %) | | 47.8 | 45.1 | 35.1 | 26.9 | 30.2 | 34 | 40.2 | 45.1 |
| Viscosity of 15% toluene solution (mPa·s) | | 8.8 | 14.5 | 33.5 | 44.7 | 20.1 | 24.9 | 30.1 | 37.5 |
| Content of component (a) (%) | | 51.8 | 58.2 | 67.5 | 76 | 45.6 | 55 | 75.5 | 84.5 |
| Number average molecular weight (ten thousands) | Component (b) | 6.7 | 9.9 | 19.5 | 22.86 | 10.6 | 14.6 | 19.2 | 22.5 |
| | Component (a) | 2 | 3 | 5.9 | 6.9 | 3.2 | 4.5 | 5.8 | 6.8 |
| Number average molecular weight ratio | | 3.35 | 3.3 | 3.305 | 3.313 | 3.313 | 3.244 | 3.31 | 3.309 |

TABLE 1-continued

| | | Polymer composition | | | | |
|---|---|---|---|---|---|---|
| | | 17 | 18 | 19 | 20 | 21 |
| Structure of component (b) | | Trifunctional Cup | Trifunctional Cup | Trifunctional Cup | Trifunctional Cup | Trifunctional Cup |
| Amount of styrene (mass %) | | 38.5 | 43.2 | 39.4 | 34.5 | 33.5 |
| Viscosity of 15% toluene solution (mPa·s) | | 35.3 | 12.5 | 12.3 | 48.3 | 43.1 |
| Content of component (a) (%) | | 83 | 91 | 85.8 | 65.5 | 48 |
| Number average molecular weight (ten thousands) | Component (b) | 16.67 | 16.5 | 13.4 | 21 | 17 |
| | Component (a) | 5.1 | 5 | 4 | 6.4 | 5.1 |
| Number average molecular weight ratio | | 3.267 | 3.3 | 3.35 | 3.28 | 3.33 |

TABLE 2

| | | Example 1 | Comparative Example 1 | Comparative Example 2 | Comparative Example 3 | Example 2 | Example 3 | Comparative Example 4 | Example 4 |
|---|---|---|---|---|---|---|---|---|---|
| Polymer composition | Type | 1 | 2 | 3 | 4 | 5 | 6 | 7 | 8 |
| | Blending quantity (parts by mass) | 100 | 100 | 100 | 100 | 100 | 100 | 100 | 100 |
| Tackifier (parts by mass) | | 300 | 200 | 300 | 300 | 300 | 300 | 300 | 300 |
| Softener (parts by mass) | | 100 | 100 | 100 | 100 | 100 | 100 | 100 | 100 |
| Finishing properties of block copolymer | | ○ | ○ | ○ | ○ | ○ | ○ | ○ | ○ |
| Solubility | | ○ | ○ | ○ | ○ | ○ | ○ | ○ | ○ |
| Melt viscosity (mPa·s) | | 1,320 | 1,670 | 1,350 | 1,850 | 1,790 | 1,480 | 1,350 | 1,360 |
| Softening point (°C.) | | 79.6 | 80.5 | 78.0 | 72.1 | 80.1 | 82.1 | 85.6 | 76.7 |
| Coating properties | | ○ | ○ | ○ | ○ | ○ | ○ | Δ | ○ |
| Ejection stability (mPa·s) | | 7 | 20 | 9 | 12 | 4 | 8 | 15 | 3 |
| Surface skin | | ○ | ○ | Δ | Δ | ◉ | ○ | ○ | ◉ |
| Odor | | Δ | Δ | Δ | Δ | Δ | Δ | Δ | Δ |
| Color of adhesive composition after kneading | | Yellow | Pale yellow | Yellow | Yellow | Pale yellow | Yellow | Yellow | Pale yellow |
| Loop tack (N/15 mm) | | 4.6 | 2.3 | 4.2 | 4.7 | 4.8 | 3.7 | 1.8 | 8.9 |
| Tack strength (N/10 mm) | | 10.4 | 11.3 | 10 | 10.2 | 9.8 | 9.2 | 6.5 | 9.7 |
| Holding power (minutes) | | 211 | 182 | 85 | 26 | 160 | 227 | 283 | 222 |

TABLE 3

| | | Comparative Example 5 | Comparative Example 6 | Example 5 | Comparative Example 7 | Comparative Example 8 | Example 6 | Example 7 | Comparative Example 9 |
|---|---|---|---|---|---|---|---|---|---|
| Polymer composition | Type | 9 | 10 | 11 | 12 | 13 | 14 | 15 | 16 |
| | Blending quantity (parts by mass) | 100 | 100 | 100 | 100 | 100 | 100 | 100 | 100 |
| Tackifier (parts by mass) | | 300 | 200 | 300 | 300 | 300 | 300 | 300 | 300 |
| Softener (parts by mass) | | 100 | 100 | 100 | 100 | 100 | 100 | 100 | 100 |
| Finishing properties of block copolymer | | X | ○ | ○ | ○ | ○ | ○ | ○ | ○ |
| Solubility | | ○ | ○ | ○ | Δ | ○ | ○ | ○ | ○ |
| Melt viscosity (mPa·s) | | 980 | 1,210 | 1,910 | 3,300 | 1,670 | 1,750 | 1,880 | 1,960 |
| Softening point (°C.) | | 71.7 | 76.3 | 82.9 | 91.3 | 78.8 | 79.4 | 76.5 | 72.1 |
| Coating properties | | ○ | ○ | ○ | X | ○ | ○ | ○ | ○ |
| Ejection stability (mPa·s) | | 21 | 19 | 2 | 4 | 18 | 9 | 3 | 2 |
| Surface skin | | ○ | ○ | ◉ | X | ○ | ○ | ◉ | Δ |

TABLE 3-continued

|  | Comparative Example 5 | Comparative Example 6 | Example 5 | Comparative Example 7 | Comparative Example 8 | Example 6 | Example 7 | Comparative Example 9 |
|---|---|---|---|---|---|---|---|---|
| Odor | Δ | Δ | Δ | Δ | Δ | Δ | Δ | Δ |
| Color of adhesive composition after kneading | Pale yellow | Pale yellow | Yellow | Yellow | Yellow | Yellow | Yellow | Yellow |
| Loop tack (N/15 mm) | 3.6 | 3.9 | 4.1 | 4.5 | 3.2 | 3.9 | 4.4 | 4.9 |
| Tack strength (N/10 mm) | 8.2 | 8.5 | 9.8 | 11.2 | 9.2 | 10.2 | 9.8 | 9.5 |
| Holding power (minutes) | 21 | 160 | 218 | 312 | 208 | 231 | 165 | 87 |

TABLE 4

|  |  | Example 8 | Comparative Example 10 | Example 9 | Comparative Example 11 | Comparative Example 12 |
|---|---|---|---|---|---|---|
| Polymer composition | Type | 17 | 18 | 19 | 20 | 21 |
|  | Blending quantity (parts by mass) | 100 | 100 | 100 | 100 | 100 |
| Tackifier (parts by mass) |  | 300 | 300 | 300 | 300 | 300 |
| Softener (parts by mass) |  | 100 | 100 | 100 | 100 | 100 |
| Finishing properties of block copolymer |  | ○ | Δ | ○ | ○ | ○ |
| Solubility |  | ○ | ○ | ○ | Δ | Δ |
| Melt viscosity (mPa · s) |  | 1,250 | 1,080 | 980 | 3,500 | 3,300 |
| Softening point (° C.) |  | 83.5 | 80.7 | 80.5 | 89.8 | 84.3 |
| Coating properties |  | ○ | ○ | ○ | Δ | Δ |
| Ejection stability (mPa · s) |  | 8 | 13 | 9 | 8 | 15 |
| Surface skin |  | ⊚ | ○ | ⊚ | X | Δ |
| Odor |  | ⊚ | Δ | ○ | Δ | Δ |
| Color of adhesive composition after kneading |  | Colorless | Yellow | Colorless | Yellow | Yellow |
| Loop tack (N/15 mm) |  | 4.9 | 4.3 | 5.2 | 4.8 | 3.2 |
| Tack strength (N/10 mm) |  | 9.2 | 7.5 | 8.8 | 10.1 | 9.8 |
| Holding power (minutes) |  | 180 | 135 | 165 | 320 | 140 |

TABLE 5

|  |  | Reference Example 1 | Reference Example 2 | Reference Example 3 | Reference Example 4 |
|---|---|---|---|---|---|
| Polymer composition | Type | 1 | 1 | 1 | 1 |
|  | Blending quantity (parts by mass) | 100 | 100 | 100 | 100 |
| Tackifier (parts by mass) |  | 70 | 550 | 300 | 300 |
| Softener (parts by mass) |  | 100 | 100 | 30 | 250 |
| Solubility |  | X | ○ | Δ | ○ |
| Melt viscosity (mPa · s) |  | 3240 | 820 | 3010 | 750 |
| Softening point (° C.) |  | 104 | 73 | 101 | 72 |
| Coating properties |  | Δ | ○ | X | ○ |
| Loop tack (N/15 mm) |  | 4.6 | 0.8 | 0.4 | 3.9 |
| Tack strength (N/10 mm) |  | 3.2 | 11 | 3.7 | 21.1 |
| Holding power (minutes) |  | 336 | 111 | 453 | 98 |

It was found the each of the viscous adhesive compositions of Examples 1 to 9 has good adhesion properties including both of the loop tack (tackiness) and tack strength, excellent in balance of these performance properties, solubility, coating properties, ejection stability, and surface skin quality.

It was further found that a block copolymer composition for a viscous adhesive including more than 80 mass % and 90 mass % or less of the component (a) and 10 mass % or more and less than 20 mass % of the component (b) achieves the performance and is excellent, having less odor and less change in color of the viscous adhesive composition after melt kneading.

It was further found that a block copolymer composition for a viscous adhesive including 50 mass % or more and 80 mass % or less of the component (a) and 20 mass % or more and 50 mass % or less of component (b) having a number average molecular weight of 160,000 or more achieves the performance and is excellent further in ejection stability and surface skin quality of the ejected strand.

This application is based on a Japanese Patent Application (Japanese Patent Application No. 2012-165195) filed with Japan Patent Office on Jul. 25, 2012, the content of which is incorporated herein by reference.

INDUSTRIAL APPLICABILITY

The viscous adhesive composition of the present invention can be used for various adhesive tapes/labels, thin plates, adhesive sheets, surface protective sheets/films, back adhesives for fixing various lightweight plastic moldings, back adhesives for fixing carpet, back adhesives for fixing tile, adhesives and the like, being industrially applicable to viscous adhesive for adhesive tapes, adhesive sheets/films, adhesive labels, surface protective sheets/films, and sanitary materials, in particular.

The invention claimed is:

1. A block copolymer composition for as viscous adhesive comprising:
   a component (a): more than 80 mass % and 90 mass % or less of a block copolymer having a number average molecular weight of 30,000 or more and 60,000or less, comprising a polymer block (A) mainly including a vinyl aromatic monomer unit and a polymer block (B) mainly including a conjugated diene monomer unit selected from the group consisting of 1,3-butadiene, 2,3-dimethy 1,3-butadiene, 1,3-pentadiene, and 3-hexacliene; and a component (b): 10 mass % or more and less than 20 mass % of a block copolymer having a number average molecular weight of more than 120,000 and 200,000 or less comprising a polymer block (A) mainly including a vinyl aromatic monomer unit and a polymer block (B) mainly including a conjugated diene monomer unit selected from the group consisting of 1,3- butadiene, 2,3-dimethyl-1,3-butadiene, 1,3-pentadiene, and 1,3-hexadiene;

a content of the vinyl aromatic monomer unit being 25 to 50 mass %;

the composition having a 15 mass % toluene solution viscosity of 10 to 40 mPas; and a number average molecular weight ratio of the component (b) to the component (a) being 2.0 to 4.0.

2. The block copolymer composition for the viscous adhesive according to claim 1, wherein the component (a) is a diblock copolymer represented by a formula (A-B); and the component (b) is a tribranch block copolymer represented by a formula (A-B)3X, wherein X represents a residue of a coupling agent or a residue of a polymerization initiator.

3. The block copolymer composition for the viscous adhesive according to claim 1, wherein the number average molecular weight ratio of the component (b) to the component (a) is 2.3 to 3.6.

4. The block copolymer composition for the viscous adhesive according to claim 1, wherein the number average molecular weight of the component (b) is 130,000 or more and 200,000 or less.

5. The block copolymer composition for the viscous adhesive according to claim 1, wherein the number average molecular weight of the component (b) is 160,000 or more and 200,000 or less.

6. A viscous adhesive composition comprising:

the block copolymer composition for the viscous adhesive according to claim 1 in an amount of 100 parts by mass;

a tackifier in an amount of 100 to 400 parts by mass; and a softener in an amount of 50 to 150 parts by mass.

7. A block copolymer composition for a viscous adhesive comprising:

a component (a):50 mass % or more and 90 mass % or less of as block copolymer having a number average molecular weight of 40,000 or more and 60,000 or less, comprising a polymer block(A) mainly including a vinyl aromatic monomer unit and a polymer block (B) mainly including a conjugated diene monomer unit selected from the group consisting of 1,3-butadiene, 2,3-dimethyl-1,3-butadiene, 1,3-pentadiene, and 1,3-hexadiene; and a component (b): 10 mass % or more and 50 mass % or less of a block copolymer having a number average molecular weight of 160,000 or more and 200,000 or less, comprising a polymer block (A) mainly including a vinyl aromatic monomer unit and a polymer block (B) mainly including a conjugated diene monomer unit selected from the group consisting of 1,3-butadiene, 2,3-dimethyl-1,3-butadiene, 1,3-pentadiene, and 1,3-hexacliene;

a content of the vinyl aromatic monomer unit being 25 to 50 mass %;

the composition having a 15 mass % toluene solution viscosity of 10 to 40 mPa s; and a number average molecular weight ratio of the component (b) to the component (a) being 2.0 to 4.0.

8. The block copolymer composition for the viscous adhesive according to claim 7, wherein the component (a) is a diblock copolymer represented by a formula (A-B); and the component (b) is a tribranch block copolymer represented by a formula (A-B)3X, wherein X represents a residue of a coupling agent or a residue of a polymerization initiator.

9. The block copolymer composition for the viscous adhesive according to claim 7, wherein the number average molecular weight ratio of the component (b) to the component (a) is 2.3 to 3.6.

10. The block copolymer composition for the viscous adhesive according to claim 7, wherein the content of the component (a) is 50 mass % or more and 80 mass % or less; and the content of the component (b) is 20 mass % or more and 50 mass % or less.

11. A viscous adhesive composition comprising:

the block copolymer composition for the viscous adhesive according to claim 7 in an amount of 100 parts by mass;

a tackifier in an amount of 100 to 400 parts by mass; and a softener in an amount of 50 to 150 parts by mass.

* * * * *